(12) United States Patent
Linsenbühler et al.

(10) Patent No.: US 9,550,180 B2
(45) Date of Patent: Jan. 24, 2017

(54) PROCESS FOR THE PREPARATION OF COATED MONOLITHS

(75) Inventors: Markus Linsenbühler, Heidelberg (DE); Bernd Sachweh, Meckenheim (DE); Saadallah Nemeh, Ellicot City, MD (US); Michel Deeba, East Brunswick, NJ (US); Michael Mertler, Freinsheim (DE); Matthias Wilhelm Meier, Ludwigshafen (DE)

(73) Assignees: BASF SE, Ludwigshafen (DE); BASF CORPORATION, Florham Park, NJ (US)

( * ) Notice: Subject to any disclaimer, the term of this patent is extended or adjusted under 35 U.S.C. 154(b) by 1095 days.

(21) Appl. No.: 13/077,225

(22) Filed: Mar. 31, 2011

(65) Prior Publication Data
US 2011/0268634 A1 Nov. 3, 2011

Related U.S. Application Data

(60) Provisional application No. 61/319,888, filed on Apr. 1, 2010.

(51) Int. Cl.
*B01D 53/86* (2006.01)
*B01J 21/04* (2006.01)
(Continued)

(52) U.S. Cl.
CPC ............ *B01J 37/0215* (2013.01); *B01D 53/94* (2013.01); *B01J 35/023* (2013.01); *B01J 35/04* (2013.01);
(Continued)

(58) Field of Classification Search
None
See application file for complete search history.

(56) References Cited

U.S. PATENT DOCUMENTS

| | | | |
|---|---|---|---|
| 4,335,023 A | 6/1982 | Dettling et al. | |
| 6,159,893 A | 12/2000 | Kondo | |
| 6,713,429 B1 | 3/2004 | Tanaka et al. | |
| 2002/0048542 A1* | 4/2002 | Deeba et al. | 423/239.1 |
| 2002/0131914 A1* | 9/2002 | Sung | 422/177 |
| 2012/0039775 A1 | 2/2012 | Schirmeister et al. | |

FOREIGN PATENT DOCUMENTS

| | | |
|---|---|---|
| DE | 19547598 | 8/1997 |
| EP | 0283220 | 9/1988 |

(Continued)

OTHER PUBLICATIONS

JP 2008-029914, Miyake et al, English Translation from PAJ.*
(Continued)

*Primary Examiner* — Colin W Slifka
(74) *Attorney, Agent, or Firm* — Oblon, McClelland, Maier & Neustadt, L.L.P.

(57) ABSTRACT

Described is a monolithic support member comprising channels with walls separating the channels and having a coating deposited thereon, the non-coated channels having a polygonal cross-section profile, wherein the mean thickness $d_C$ of the coating in a corner of said cross-section profile is smaller than or equal to the mean thickness $d_E$ of the coating on an edge of said cross-section profile plus 85 micrometer. Also described is a method for the preparation of such coated monolithic support member. Further described is the use of such coated monolithic support member as a catalytic article in automotive exhaust gas treatment.

25 Claims, 10 Drawing Sheets

Figure 1:
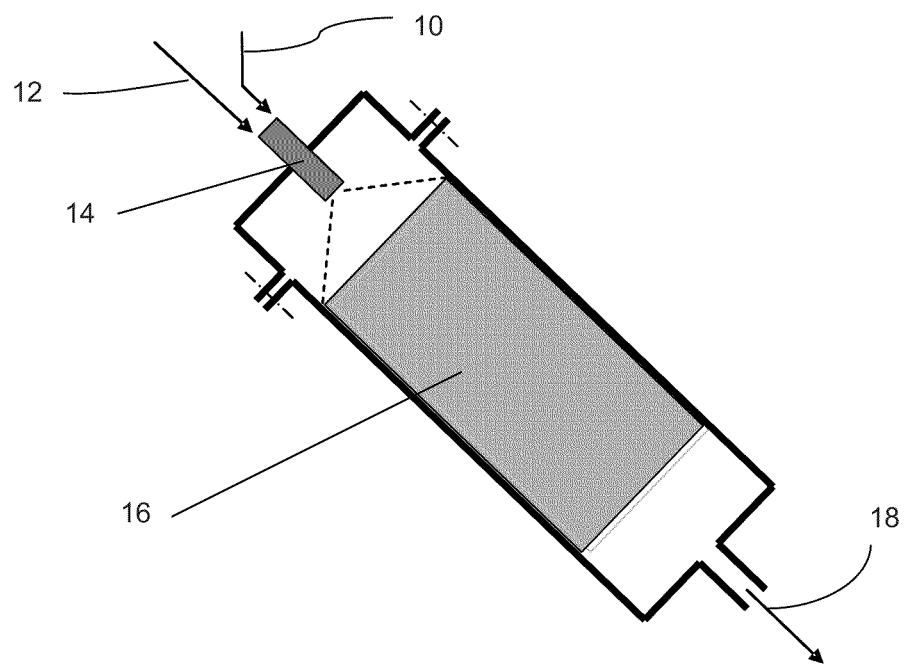

(51) Int. Cl.
  *B01J 21/06* (2006.01)
  *B01J 27/224* (2006.01)
  *B01J 29/06* (2006.01)
  *B01J 35/02* (2006.01)
  *B01J 37/02* (2006.01)
  *B01D 53/94* (2006.01)
  *B01J 35/04* (2006.01)
  *B01J 37/00* (2006.01)
  *B05D 1/02* (2006.01)
  *B05D 7/22* (2006.01)
(52) U.S. Cl.
  CPC ......... *B01J 37/0036* (2013.01); *B01J 37/0232* (2013.01); *B01J 37/0248* (2013.01); *B01D 53/944* (2013.01); *B01D 53/9445* (2013.01); *B01D 2255/1021* (2013.01); *B01D 2255/2092* (2013.01); *B05D 1/02* (2013.01); *B05D 7/22* (2013.01); *Y02T 10/22* (2013.01)

(56) References Cited

FOREIGN PATENT DOCUMENTS

| EP | 1364708 | 11/2003 |
| JP | 2002/346389 | 12/2002 |
| JP | 2008-029914 | 2/2008 |
| WO | WO-2007/040348 | 4/2007 |

OTHER PUBLICATIONS

"IPRP and Written Opinion in PCT/IB2011/051377", Oct. 2, 2012, 7 pgs.
Extended European Search Report (European Appln. No. 11762107.8) in PCT/IB2011/051377, mailed Feb. 19, 2014, 12 pages.
PCT International Search Report in PCT/IB2011/051377, mailed Aug. 11, 2011, 4 pgs.

* cited by examiner $$d_C = \frac{1}{2}\left(d_{C,total} - \frac{1}{\sin(45°)}d_W\right)$$

$$d_E = \frac{1}{2}(d_{E,total} - d_W)$$

PROCESS FOR THE PREPARATION OF COATED MONOLITHS

CROSS-REFERENCE TO RELATED APPLICATIONS

This application claims the benefit of priority under 35 U.S.C. §119(e) to U.S. Patent Application No. 61/319,888, filed Apr. 1, 2010, which is hereby incorporated by reference in its entirety.

TECHNICAL FIELD

The present invention relates to a method for the preparation of a coated monolithic support member which comprises channels with walls separating the channels from each other. According to the present invention, in a first step (i), a preferably aqueous suspension is provided having a specific solid content in the range of from 15 to 40 wt.-% based on the total weight of the suspension. In a second step (ii), said suspension is suitably dispersed into a gas stream, and the resulting gas stream is subsequently directed towards the monolithic support member wherein a coating is applied onto the walls of the monolithic support member. Preferably, dispersing and directing is performed using a device containing at least one spray nozzle which is located opposite the monolithic support member. Further, the present invention relates to the coated monolithic support member thus obtained and its use, in particular in the field of catalysis.

BACKGROUND

In the field of catalysis, such as in the field of catalysts for the treatment of automotive exhaust, catalysts are employed wherein catalytically active materials are usually applied to a monolithic support member. In most of the respective applications, flow-through monoliths are used which comprise channels with walls separating the channels from each other. In most cases, such channels have polygonal cross-section wherein rectangular, in particular square cross-sections are preferred. If the catalytically active materials are applied onto the walls of these channels having rectangular cross-section, it is a common problem that in the corners formed by two adjacent walls, a fillet portion of the coating is formed during application of the coating. These fillet portions roughly define a concave profile in cross-section, and according to known processes of the art such as, for example, dip coating processes, the radius of this concave profile is comparatively large. This in turn means that a comparatively high amount of coating and, thus, a comparatively high amount of catalytically active material which is contained in the fillet portions is not accessible for the exhaust gas stream and, therefore, useless for the desired application of the coated support member as catalyst. Due to the fact that for several catalytic purposes, such catalytically active material comprises at least one precious metal component, such waste of catalytically active material in the fillet portions is also a considerable economic disadvantage. Further, the larger said concave radius of the fillet portions, the lower is the surface which is accessible for the exhaust stream within a given channel of the monolithic support member. Therefore, large radii will lead to an undesired loss of catalytic activity of the coated monolith. Also, an undesired increase of pressure loss can be expected from large radii.

DE 199 61 483 B4 discloses catalysts for the purification of the exhaust gas of an ignition engine. According to this document, monolithic support members are disclosed with hexagonal cells wherein the thickness of a catalytically active layer coated onto the walls of the monolith is 10 to 70 micrometer in the thinnest areas and wherein, in the thickest areas, the thickness is not more than 12 times the thickness of the thickness in the thinnest area. In particular according to FIG. 3 of DE 199 61 483 B4, avoiding large radii of the fillet portions is not achieved.

Figure 2:
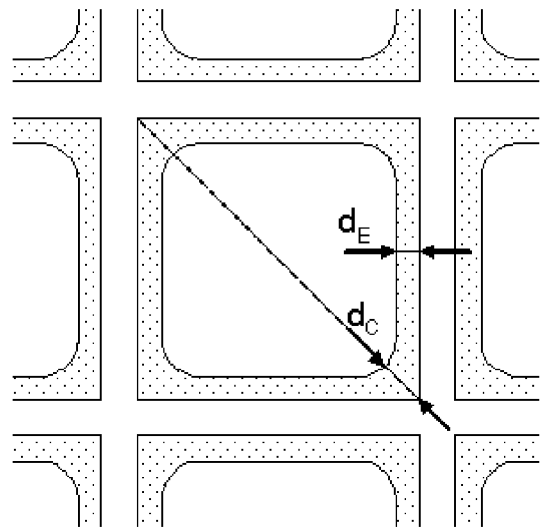
Figure 2:
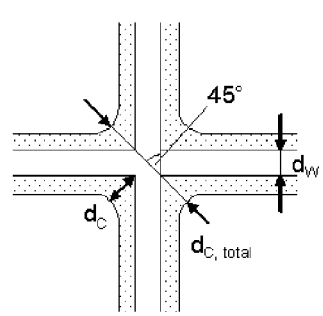
Figure 2:
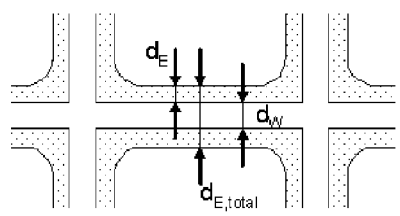
Figure 3:
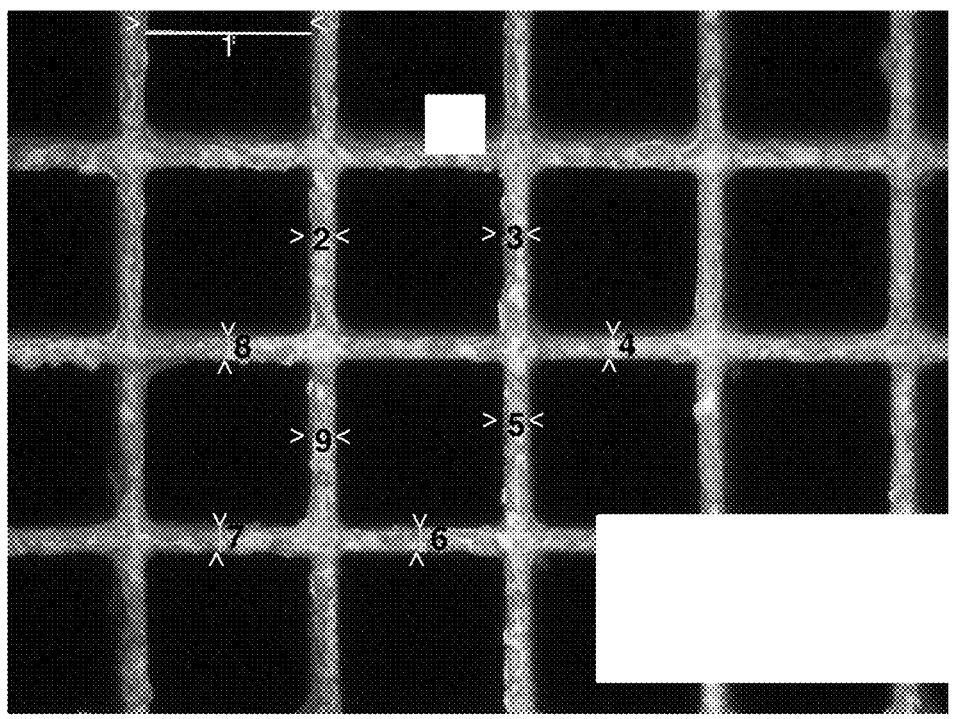
Figure 3:
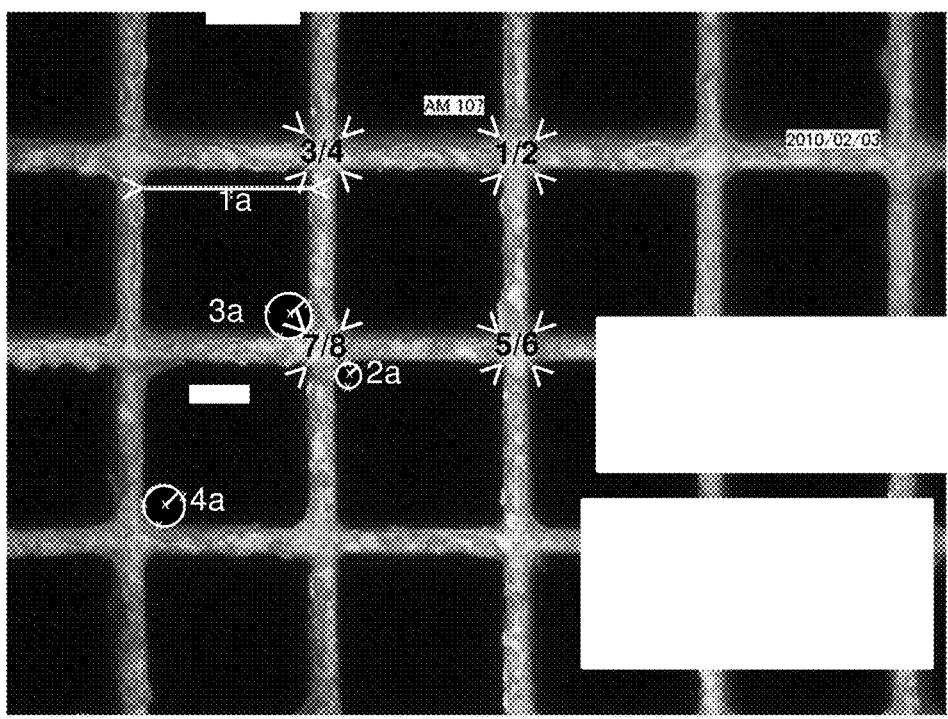
Figure 3A:
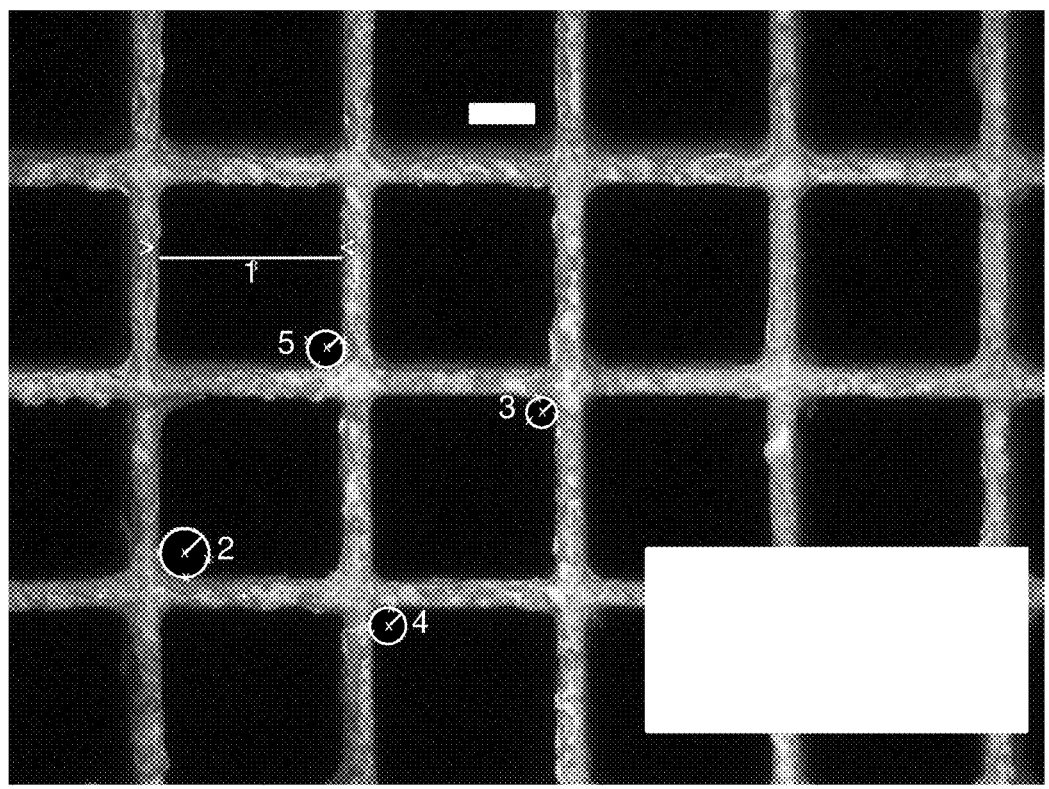
Figure 4:
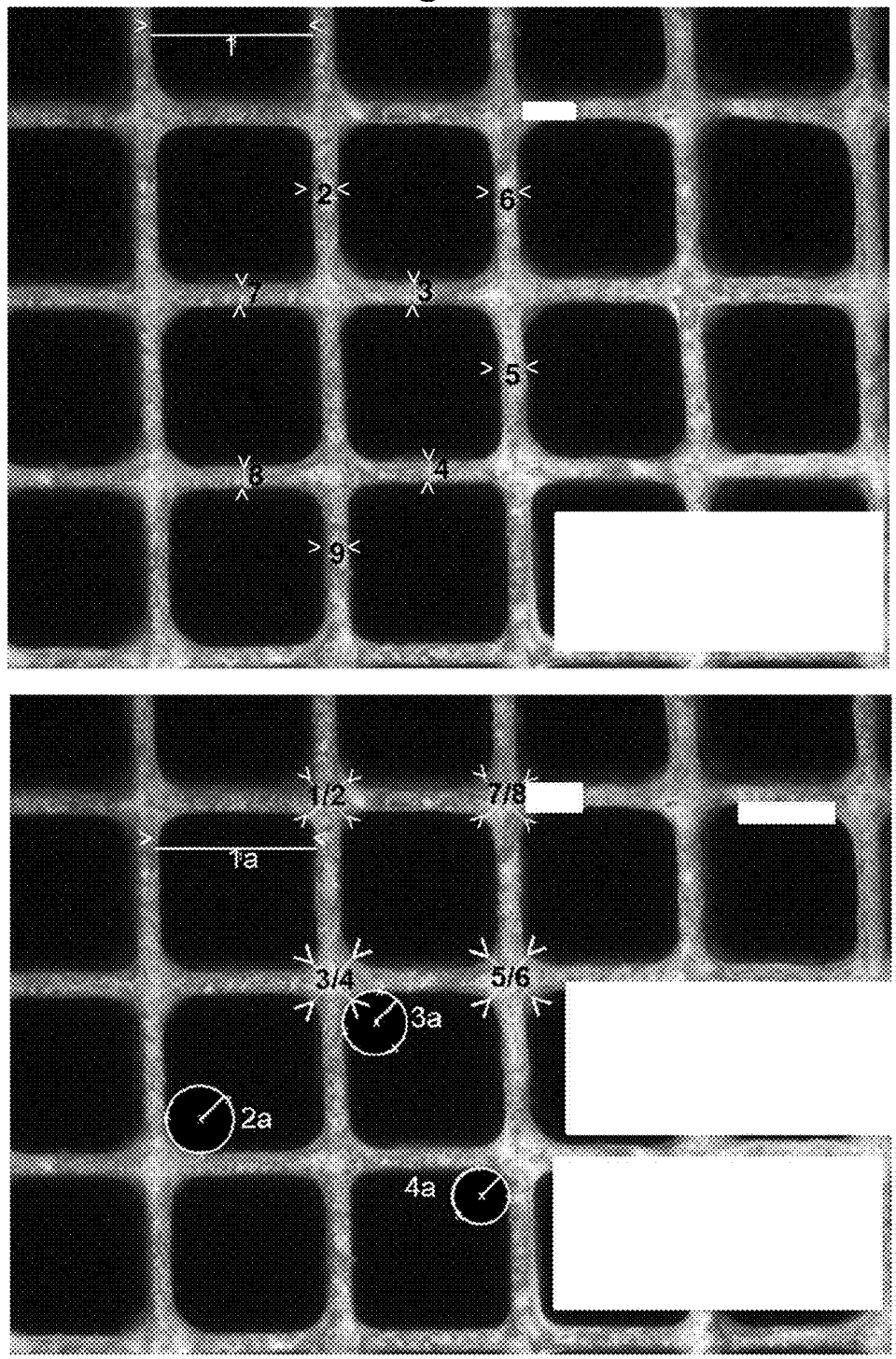
Figure 4A:
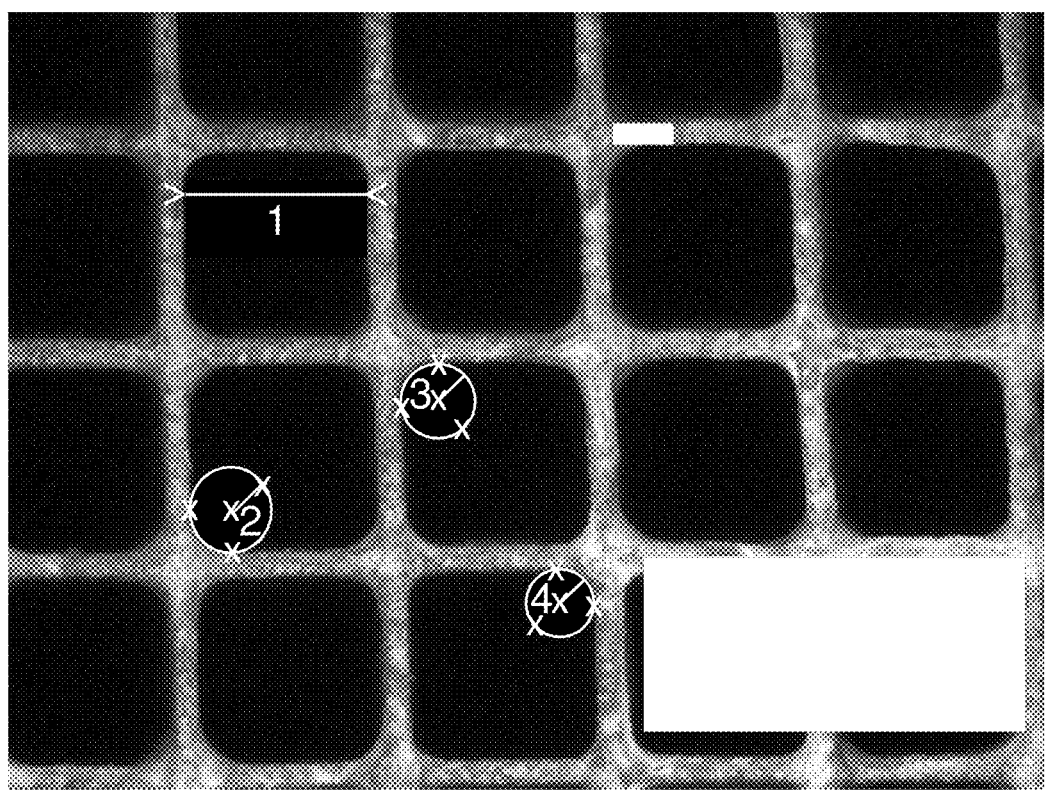

U.S. Pat. No. 4,335,023 discloses monolithic support members supporting catalytic promoting materials wherein the channels of said members are nominally polygonal, preferably square in cross-section profile. In the context of U.S. Pat. No. 4,335,023 it is described that the juncture of the channel walls are filleted to provide a concave profile. Thus, by changing the monolithic support member as such, preventing or at least reducing the accumulation of excess catalytic material which occurs in the sharp angular corners is achieved. However, changing the geometry of the monolithic support member as such will lead to an increased difficulty in preparing the monolith. According to FIG. 5 of U.S. Pat. No. 4,335,023, stippled portions $A_B$ are shown in the juncture corners of the walls which is not readily accessible. FIGS. 2, 3 and 4 of U.S. Pat. No. 4,335,023 show coated monolithic support members which are described in detail in table A in column 9. According to this table, the smallest radius of curvature of the coating in the fillet portions is 0.0168 inches, corresponding to 0.043 cm. As discussed above, for avoiding too large a radius, U.S. Pat. No. 4,335,023 teaches to change the monolithic support member, and no teaching is given as far as an improved method for coating common monolithic support members is concerned.

Therefore, it was an object of the present invention to provide a method for coating a monolithic support member comprising channels with walls separating the channels from each other, the channels having a polygonal cross-section profile, wherein in the coated monolithic support member, the junctures of two adjacent coated walls are formed by coating fillet portions, and wherein a coating fillet portion defines in cross-section a concave profile of a depth extending to the midpoint of a segment of a circle taken as disposed tangentially with respect to the two adjacent coated walls, wherein said circle has a small radius R.

Surprisingly, it was found that it is possible to manufacture such coated monolithic support members by a method wherein a suspension exhibiting a specific solid content is dispersed in a gas stream and the gas stream is directed towards the monolithic support member along the axial direction of the channels of the support, wherein the mass flow of the dispersed suspension as well as time for which the dispersed suspension is directed towards the monolithic support member are in specific ranges.

SUMMARY OF THE INVENTION

The present invention relates to a method for the preparation of a coated monolithic support member comprising channels with walls separating the channels from each other, said channels having a polygonal, preferably a rectangular, more preferably a square cross-section profile, the method comprising.

(i) providing a suspension having a viscosity in the range of from 0.5 to 100 mPas, determined by shearing the suspension at a shear rate of 100 s$^{-1}$, and having a solid content in the range of from 1 to 40 wt.-%, based on the total weight of the suspension, said suspension preferably being an aqueous suspension;

(ii) dispersing the suspension into a gas stream to obtain a gas stream comprising droplets having a droplet size in the range of from d10 greater than or equal to 1 micrometer to d90 smaller than or equal to 100 micrometer;

(iii) directing said gas stream comprising said droplet towards the monolithic support member along the axial direction of the channels of the support.

Further, the present invention relates to a monolithic support member comprising channels with walls having a coating deposited thereon, obtainable or obtained by above-defined method.

Yet further, the present invention relates to a monolithic support member comprising channels with walls separating the channels from each other and having a coating deposited thereon, the non-coated channels having a polygonal cross-section profile, preferably a rectangular cross-section profile, more preferably a square cross-section profile, wherein the mean thickness $d_C$ of the coating in a corner of said cross-section profile is smaller than or equal to the mean thickness $d_E$ of the coating on an edge of said cross-section profile plus 85 micrometer ($d_C \leq (d_E + 85$ micrometer)), preferably plus 80 micrometer, wherein this monolithic support member is preferably obtainable or obtained by above-defined method.

Still further, the present invention relates to the use of above-defined monolithic support member, preferably obtainable or obtained by above-defined method, as catalytic article, preferably as catalytic article for the treatment of an exhaust gas, more preferably for the treatment of an automotive exhaust gas. Thus, the present invention also relates to a process for treating an exhaust gas, preferably of treating an automotive exhaust gas by contacting above-defined monolithic support member, preferably obtainable or obtained by above-defined method, with the exhaust gas, preferably the automotive exhaust gas.

BRIEF DESCRIPTION OF THE FIGURES

FIG. 1 shows an exemplary layout of the apparatus used according to the present invention wherein the suspension is directed towards the monolithic support member in angular top downwards direction at an angle of 45°. In FIG. 1, the abbreviations used stand for:

(10) Dispersing gas inlet
(12) Suspension inlet
(14) Dispersing unit (e.g. one or more (spray) nozzle(s))
(16) Monolith
(18) Gas outlet FIG. 2 shows a schematic drawing illustrating how the values $d_E$ (mean thickness of the coating on the edges of the inventive coated monolithic support member) and $d_C$ (mean thickness of the coating in the corners of the inventive coated monolithic support member) are determined.

FIG. 3 shows a coated monolithic support member obtained according to the inventive method as described in Example 2. Both pictures of FIG. 3 show the same cross-section profile. In the first picture, determination of the parameter $d_E$ is shown. In the second picture, determination of the parameter $d_C$ is shown. The third picture (in FIG. 3*a*), determination of the parameter R (radius in the corners of the cross-section profile) is shown.

FIG. 4 shows a coated monolithic support member obtained according to a dip-coating method of the prior art as described in Comparative Example 1. Both pictures of FIG. 4 show the same cross-section profile. In the first picture, determination of the parameter $d_E$ is shown. In the second picture, determination of the parameter $d_C$ is shown.

In the third picture (in FIG. 4*a*), determination of the parameter R (radius in the corners of the cross-section profile) is shown.

FIG. 5 shows a coated monolithic support member obtained according to a dip-coating method of the prior art as described in Comparative Example 2. Both pictures of FIG. 5 show the same cross-section profile. In the first picture, determination of the parameter $d_E$ is shown. In the second picture, determination of the parameter $d_C$ is shown. The second picture shows also the determination of the parameter R (radius in the corners of the cross-section profile).

FIG. 6 shows a coated monolithic support member obtained according to a spray-coating method of based on a suspension outside the characteristics of the inventive method (viscosity). Preparation of the coated monolithic support member is described in Comparative Example 3.

FIG. 7 shows a coated monolithic support member obtained according to a spray-coating method of based on a suspension outside the characteristics of the inventive method (solid content). Preparation of the coated monolithic support member is described in Comparative Example 4.

FIG. 8 shows the test results as described in Example 3 wherein three coated monolithic support members were subjected to a hydrocarbon stream. The abbreviation "C [%]" stand for "Hydrocarbon Conversion [%]", the abbreviation "E2" stand for results obtained using the catalyst of Example 2, the abbreviation "CE1" stand for results obtained by using the catalyst of Comparative Example 1, and the abbreviation "CE2" stand for results obtained by using the catalyst of Comparative Example 2.

DETAILED DESCRIPTION OF THE INVENTION

As mentioned above, the present invention relates to method for the preparation of a coated monolithic support member comprising channels with walls separating the channels from each other, said channels having a polygonal, preferably a rectangular, more preferably a square cross-section profile, the method comprising (i) providing a suspension having a viscosity in the range of from 0.5 to 100 mPas, determined by shearing the suspension at a shear rate of 100 $s^{-1}$, and having a solid content in the range of from 1 to 40 wt.-%, based on the total weight of the suspension, said suspension preferably being an aqueous suspension;

(ii) dispersing the suspension into a gas stream to obtain a gas stream comprising droplets having a droplet size in the range of from d10 greater than or equal to 1 micrometer to d90 smaller than or equal to 100 micrometer;

(iii) directing said gas stream comprising said droplet towards the monolithic support member along the axial direction of the channels of the support.

According to the present, it was found that a specific combination of certain features of a suspension provided in (i), namely a specific viscosity of the suspension and a specific solid content of the suspension, with a specific parameter of the dispersed suspension in (ii), namely the mean droplet size of the dispersed suspension, allows for obtaining the coated monolithic support members having superior coating characteristics wherein the corners of the cross-section profile contain a minimized amount of coating material. In particular for the case where the cross-section profile of the monolithic support member is a rectangular or square, the coated monolithic support members, compared to the prior art articles, exhibit this superior feature and contain, in the corners of the cross-section profile, such a low amount of coating material that the coating according to the present invention can be referred to as "rectangular coating" or "square coating".

Step (i)

According to step (i) of the present invention, a suspension is provided which has a viscosity in the range of from 0.5 to 100 mPas, determined by shearing the suspension at a shear rate of 100 s$^{-1}$. More preferably, the viscosity is in the range of from 1 to 50 mPas, preferably from 1.5 to 30 mPas, more preferably from 1.5 to 20 mPas. Thus, typical viscosity values of the suspensions according to the present invention are in the range of from 1.5 to 5 mPas or from 5 to 10 mPas or from 10 to 15 mPas or from 15 to 20 mPas. Especially preferred low-viscosity values of the suspension according to the present invention are, for example, in the range of from 1.5 to 4 mPas, more preferably from 2 to 3 mPas. As defined above, all viscosity values of the suspension as provided in (i) are to be understood as being determined by shearing the suspension at a shear rate of 100 s$^{-1}$ with a cone-plate-rheometer, e.g. with an Anton-Paar MCR-100 rheometer.

Further in step (i), the provided suspension has a solid content in the range of from 1 to 40 wt.-%, based on the total weight of the suspension. While it is generally possible that the suspension has a low solid content such as, for example, from 1 to 20 wt.-%, it is preferred that the solid content is in the range of from 20 to 40 wt.-%, more preferably from 20 to 35 wt.-%. In particular, the solid content of the suspension provided in step (i) of the process according to the present invention is in the range of from 20 to 30 wt.-%.

Further, it was found that the process of the present invention may be especially advantageous in case the mean particle size of the particles of the solid material which is present in the suspension provided in (i) is in a specific range. Preferred particle sizes are in the range of $d_{90}$ smaller than or equal to 10 micrometer, more preferably $d_{90}$ smaller than or equal to 7 micrometer and more preferably $d_{90}$ smaller than or equal to 5 micrometer. Especially preferred particle sizes are in the range of $d_{90}$ smaller than or equal to 3 micrometer, more preferably $d_{90}$ smaller than or equal to 2 micrometer. The term "particle size" as used in this context of the present invention is to be understood as particle size determined by laser diffraction measurement of the suspension or a dilution of the suspension. The term "$d_{90}$" means that the collective of all particles which are smaller than or equal to this size comprise 90% of the particle volume of the entire sample. Generally, the method of the present invention can be used to apply to virtually any kind of coating onto a monolithic support member. According to a preferred embodiment, the coating applied by the method of the present invention comprises at least one catalytically active component, due to the fact that according to a preferred use of the present invention, the coated monolithic support members are employed as catalytic articles. Generally, there are no specific restrictions as far as the at least one catalytically active component is concerned. Among others, catalytically active metals or precursors of catalytically active metals can be mentioned. The term "precursor of a catalytically active metal" as used in this context of the present invention refers to a compound which, when subjected to the method of the present invention, results in a catalytically active metal which is present in the finally obtained coated monolithic support member. For the sake of illustration, but not meant to be limiting in any manner, such precursor of a catalytically active metal can be a salt of said metal comprised in the suspension according to (i) which, when dispersing the suspension in (ii) and/or when applying the dispersed suspension in (iii) and/or subjected the coated monolithic support member to drying and/or calcination and/or treating with a suitable gas stream as described hereinunder in more detail, is converted into the catalytically active metal. As other catalytically active components, for example, catalytic reaction promoting compounds such as promoter metals or precursors thereof, catalytically active porous compounds such as zeolites or precursors thereof, molecular sieves or precursors thereof can be mentioned.

According to a preferred embodiment of the present invention, the suspension provided in (i) comprises at least one catalytically active metal or a suitable precursor thereof. In particular, as defined hereinabove in general, the term "suitable precursor of a catalytically active metal" refers to a salt of the catalytically active metal which, having been subjected to the method of the present invention, is present in the coated monolithic support member as metallic compound. Preferably, the at least catalytically active metal is selected from the group consisting of manganese, copper, nickel, iron, chromium, zinc, palladium, platinum, rhodium, ruthenium, silver, gold and mixture of two or more thereof. More preferably, the at least catalytically active metal is selected from the group consisting of palladium, platinum, rhodium, ruthenium and a mixture of two or more thereof. More preferably, the catalytically active metal is platinum or a mixture of platinum and palladium.

Typical precursors of such metals to be mentioned in this context of the present invention are, for example, platinum amine hydroxide, platinum nitrate, tetramine platinum hydroxide or chloride, palladium nitrate, tetramine palladium nitrate or chloride, or rhodium nitrate.

Generally, there are no specific restrictions as to the content of the suspension provided in (i) with regard to the at least one catalytically active metal or suitable precursor thereof with the proviso that above-defined viscosity values and solid content values are realized. According to the present invention, it was found that preferred contents of the suspension provided in (i) with regard to the catalytically active metal or the suitable precursor thereof are in the range of from 0.5 to 15 wt.-%, based on the total weight of the solids contained in the suspension. More preferably, the content of the suspension provided in (i) with regard to the catalytically active metal or the suitable precursor thereof is in the range of from 0.6 to 14 wt.-%, more preferably from 0.7 to 13 wt.-%, more preferably from 0.8 to 12 wt.-%, more preferably from 0.9 to 11 wt.-%, more preferably from 1 to 10 wt.-%. If two or more catalytically active metals or suitable precursors thereof are contained in the suspension, these values refer to the sum of the individual contents of each catalytically active metal or precursor thereof.

According to a preferred embodiment of the present invention, the suspension provided in (i) contains, in addition to the at least one catalytically active metal or suitable precursor thereof, at least carrier, in particular at least one carrier for the at least one catalytically active metal or precursor thereof, or at least one suitable precursor of at least one carrier. The term "precursor of a carrier" as used in this context of the present invention refers to a compound which, when subjected to the method of the present invention, results in a carrier which is present in the finally obtained coated monolithic support member.

Preferred carriers of the present invention include, but are not limited to, oxides and/or mixed oxides, in particular porous oxides and/or mixed porous oxides wherein a given porous oxide or mixed porous oxide can be amorphous, or crystalline, or amorphous and crystalline. Such oxides may comprise micropores, or mesopores, or macropores, or micro- and mesopores, or micro- and macropores, or micro- and meso- and macropores. While there are no specific restrictions, it is preferred that the porous oxide is a refractory metal oxide. More preferably, the porous oxide is selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, a zeolite, a molecular sieve, and a mixture of two or more thereof. More preferably, the at least one porous support material is selected from the group consisting of $Al_2O_3$, $ZrO_2$, $CeO_2$, $SiO_2$ and a mixture of two or more thereof.

Conceivable zeolites may be naturally occurring or chemically synthesized or naturally occurring and chemically treated zeolites. Conceivable structure types of zeolites are defined, for example in the Atlas of Zeolite Structure Types and include, but are not limited to, the structure types ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EPI, ERI, ESV, ETR, EUO, FAU, FER, FRA, GIS, GIU, GME, GON, GOO, HEU, IFR, ISV, ITE, ITH, ITW, IWR, IWW, JBW, KFI, LAU, LEV, LIO, LOS, LOV, LTA, LTL, LTN, MAR, MAZ, MEI, MEL, MEP, MER, MMFI, MFS, MON, MOR, MSO, MTF, MTN, MTT, MTW, MWW, NAB, NAT, NES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN SFO, SGT, SOD, SSY, STF, STI, STT, TER, THO, TON, TSC, UEI, UFI, UOZ, USI, UTL, VET, VFI, VNI, VSV, WEI, WEN, YNU, YUG and ZON. Reference is made to http://iz-asc.ethz.ch/fmi/xsl/IZA-SC/ft.xsl). Typical zeolites are, for example, chabazite, mordenite, zeolite beta, ZSM-5.

According to a preferred embodiment, the refractory metal oxide essentially consists of alumina, more preferably of gamma alumina or activated alumina, such as gamma or eta alumina. Preferably, the activated alumina has a specific surface area, determined according to BET surface area measurements, of from 60 to 300 $m^2/g$, preferably from 90 to 200 $m^2/g$, more preferably from 100 to 180 $m^2/g$. Therefore, the present invention also relates to the method as defined above, wherein the carrier contained in the suspension provided in (i) is $Al_2O_3$, preferably gamma-$Al_2O_3$.

Generally, there are no specific restrictions as to the content of the suspension provided in (i) with regard to the at least carrier or suitable precursor thereof with the proviso that above-defined viscosity values and solid content values are realized. According to the present invention, it was found that preferred contents of the suspension provided in (i) with regard to the carrier or the suitable precursor thereof are in the range of from 0.01 to 40 wt.-%. More preferably, the content of the suspension provided in (i) with regard to the carrier or the suitable precursor thereof is in the range of from 0.1 to 35 wt.-%, more preferably from 0.5 to 30 wt.-%, more preferably from 1 to 25 wt.-%. If two or more carriers or suitable precursors thereof are contained in the suspension, these values refer to the sum of the individual contents of each carrier or precursor thereof. Typically according to the present invention, the at least one carrier is used as carrier for the at least one catalytically active metal.

As far as providing the suspension in (i) is concerned, there are no specific restrictions with the proviso that the suspension obtained has above-defined characteristics. In case the suspension contains at least one catalytically active metal or suitable precursor thereof and/or at least one carrier or suitable precursor thereof, preferably at least one catalytically active metal or suitable precursor thereof and at least one carrier or suitable precursor thereof, more preferably at least one catalytically active metal precursor and at least carrier, it is preferred to impregnate the carrier or precursor thereof with at least one solution containing the at least one catalytically active metal or precursor thereof. As far as the solvent employed, no specific restrictions exist with the proviso that the suspension obtained can be subjected to step (ii) of the present invention. According to a preferred embodiment, the solution is an aqueous solution. The impregnated carrier is then preferably admixed with at least one suitable liquid in order to obtain the suspension of (i). Preferably, this liquid is water, more preferably deionized water.

Depending on the type of the compound with which the monolithic support member shall be coated, in particular the type of carrier or precursor thereof and/or the type of catalytically active metal or precursor thereof, it may be possible that, for example, the particle size of the solid particles has to be decreased in order to allow for obtaining a suspension having above-defined characteristics. In such case, the size of the particles is suitably decreased by any conceivable method. According to a preferred embodiment, based on the compound to be coated onto the monolithic support member, in particular the impregnated carrier as defined above, a first suspension is prepared which is suitably subjected to milling in order to decrease the particle size of the solid.

From such particle size decreasing step, in particular milling step which may be carried out at least once, a suspension is obtained which comprises the solid with particles having a particle size as defined above, in the range of $d_{90}$ smaller than or equal to 10 micrometer, preferably $d_{90}$ smaller than or equal to 7 micrometer, more preferably $d_{90}$ smaller than or equal to 5 micrometer.

Depending on the viscosity of the thus obtained suspension, it may be necessary to suitably concentrate or dilute the suspension in order to obtain the suspension to be provided in (i) having above-defined viscosities. Preferably, the suspension obtained from the at least one step of decreasing the particle size is diluted with at least one suitable liquid, preferably water, more preferably deionized water, to obtain the suspension having a viscosity in the range of from 0.5 to 100 mPas, determined by shearing the suspension at a shear rate of 100 $s^{-1}$, and having a solid content in the range of from 1 to 40 wt.-%, based on the total weight of the suspension.

Especially in the case wherein the compound to be coated comprises at least one catalytically active metal or precursor thereof, the metal preferably being selected from manganese, copper, nickel, iron, chromium, zinc, palladium, platinum, rhodium, ruthenium, silver, gold and mixture of two or more thereof, more preferably from the group consisting of palladium, platinum, rhodium, ruthenium and a mixture of two or more thereof, the metal in particular being platinum or a mixture of platinum and palladium, and further comprises at least one carrier, or precursor thereof, for said catalytically active metal or precursor thereof, the carrier preferably being selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, a zeolite, a molecular sieve, and a mixture of two or more thereof, more preferably from the group consisting of Al2O3, ZrO2, CeO2, SiO2 and a mixture of two or more thereof, the carrier in particular being alumina, more preferably gamma-alumina, it was found that during preparation of the suspension provided in (i), the pH of the suspensions obtained during the preparation in (i), should be kept in a range of from 3 to 5, more preferably from 3.4 to 4.5. Adjusting the pH of the solutions at such values is may be achieved by adding suitable amount of at least one suitable acid. Typical acids are, for example, acetic acid, nitric acid, or tartaric acid, with acetic acid and nitric acid being especially preferred.

Therefore, the present invention also relates to the method as defined above, wherein in (i), the suspension is provided by a process comprising (a) impregnating at least one carrier or suitable precursor thereof with at least one solution containing at least one catalytically active metal or suitable precursor thereof;

(b) admixing the at least one impregnated carrier or suitable precursor thereof with water and a suitable amount of an acid to obtain a suspension having a pH in the range of from 3 to 5 and a solid content in the range of from 20 to 50 wt.-%;

(c) milling the suspension obtained in (b) obtaining a suspension wherein the particle size d90 of the particles of the suspension provided in (i) is smaller than or equal to 10 micrometer, preferably smaller than or equal to 7 micrometer, more preferably smaller than or equal to 5 micrometer;

(d) diluting the suspension obtained in (c) with deionized water, optionally additionally with a suitable amount of an acid, to obtain the suspension having a viscosity in the range of from 0.5 to 100 mPas, determined by shearing the suspension at a shear rate of 100 s−1, and having a solid content in the range of from 1 to 40 wt.-%, based on the total weight of the suspension.

According to an especially preferred embodiment, the present invention also relates to the method as defined above, wherein in (i), the suspension is provided by a process comprising (a) impregnating alumina with a solution containing a platinum salt, preferably platinum hydroxide as catalytically active metal precursor, or with a solution containing a platinum salt and a palladium salt, preferably platinum amine hydroxide and palladium nitrate as catalytically active metal precursors;

(b) admixing the impregnated alumina with deionized water a suitable amount of an acid, preferably acetic acid, to obtain a suspension having a pH in the range of from 3 to 5 and a solid content in the range of from 20 to 50 wt.-%;

(c) milling the suspension obtained in (b) obtaining a suspension wherein the particle size d90 of the particles of the suspension provided in (i) is smaller than or equal to 10 micrometer, preferably smaller than or equal to 7 micrometer, more preferably smaller than or equal to 5 micrometer;

(d) diluting the suspension obtained in (c) with deionized water to obtain the suspension having a viscosity in the range of from 0.5 to 100 mPas, determined by shearing the suspension at a shear rate of 100 s−1, and having a solid content in the range of from 1 to 40 wt.-%, based on the total weight of the suspension.

At any stage of the process for the preparation of the suspension in (i), one or more further components may be added, in addition to the compounds already described above. Depending on the use of the finally obtained coated monolithic support member, one or more suitable promoters or suitable precursors thereof, such as La, Pr, Nd, Ba, and/or Sr, and/or one or more suitable pore forming agents, such as cellulose derivatives like methyl cellulose or ethyl cellulose, polystyrenes, polyacrylates, poly-methacrylates, polyolefins, polyamides, or polyesters. It is also conceivable to add one or more defoaming agents such as octanol or other suitable surfactants.

Each individual step during preparation of the suspension in (i) can be carried out at suitable pressure and temperature. According to a preferred embodiment, each individual step is carried out at a temperature of from 20 to 30° C. and at ambient pressure.

Step (ii)

According to step (ii) of the method of the present invention, the suspension obtained from (i) is dispersed into a gas stream to obtain a gas stream comprising droplets having a droplet size in the range of from d10 greater than or equal to 1 micrometer to d90 smaller than or equal to 100 micrometer. The droplet sizes d10 and d90 as used in this context of the present invention are to be understood in the same way as the d90 for suspension particle size: the collective of all droplets that are smaller than or equal to d10 contain 10% of the entire droplet volume of the measured sample, the collective of all droplets that are smaller than or equal to d90 contain 90% of the entire droplet volume of the measured sample. Droplet sizes can be measured by a laser diffraction system, e.g. a Malvern Insitec T.

Generally, there are no specific restrictions as far as the method is concerned according to which the suspension obtained in (i) is entrained in the gas stream in step (ii). According to a particularly preferred embodiment of the present invention, entraining the suspension obtained in (i) in a gas stream is performed using a spray nozzle, in particular a two-phase spray-nozzle. In such two-phase spray nozzle, the suspension from (i) is injected into the nozzle or fed under pressure or under gravity to the nozzle. Further, a gas stream is injected into the nozzle which acts as atomizing medium for the suspension. In the nozzle, the suspension is dispersed into fine droplets by the shear forces exerted on the suspension by the expanding gas stream. Usual spray nozzles allowing for droplet sizes in above-defined range can be used in the context of the present invention, such as two-phase nozzles by Schlick or by Lechler, like e.g. Schlick model 970.

As far as the characteristics of the nozzle are concerned in the context of step (ii), there are no specific restrictions provided that the desired droplet size in above-defined range can be obtained.

Typically, the gas stream is injected into the nozzle under pressure. According to the present, it is preferred to introduce the gas stream into the nozzle under a pressure in the range of from 0.5 to 2 bar, preferably from 0.5 to 1.5 bar, more preferably from 0.5 to 1.2 bar.

Generally, it is possible to heat the gas stream prior to introducing the stream into the nozzle. According to the present invention, typical temperatures of the gas stream are in the range of from 0 to 100° C., more preferably from 10 to 75° C., more preferably from 15 to 50° C.

As to the gas stream used for entraining the suspension, there are no specific restrictions. According to the present invention, preferred gases of the gas stream are selected from nitrogen, air, lean air, argon, water, and a mixture of two or more thereof. Especially preferred are nitrogen or a mixture of nitrogen with water. In case the gas stream in which the suspension is entrained is nitrogen which contains water, mixtures are preferred which contain from 53 to 99.5 vol.-% of nitrogen and from 47 to 0.5 vol.-% of water. According to present invention, in case the gas stream in which the suspension is entrained is nitrogen which contains water, mixtures are more preferred which contain from 62 to 99.5 vol.-% of nitrogen and from 0.5 to 38 vol.-% of water, more preferably from 88 to 99.5 vol.-% of nitrogen and from 0.5 to 12 vol.-% of water.

As described above, the droplet size obtained from entraining the suspension into the gas stream is in the range of from d10 greater than or equal to 1 micrometer to d90 smaller than or equal to 100 micrometer. According to a conceivable embodiment of the present invention, droplet sizes down to d90 smaller than or equal to 0.1 micrometer are envisaged. Preferably, the droplet size is in the range of from d10 greater than or equal to 1 micrometer to d90 smaller than or equal to 70 micrometer, more preferably in the range of from d10 greater than or equal to 1 micrometer to d90 smaller than or equal to 50 micrometer.

According to step (iii) of the method of the present invention, the gas stream comprising the droplets having above-defined droplet size is directed towards the monolithic support member along the axial direction of the channels of the support. Therefore, as far as above-described nozzle is concerned, it is preferred to disperse the suspension into the gas stream by entraining the suspension into the gas stream and directing the gas stream through at least one spray nozzle, wherein the at least one spray nozzle is located opposite the monolithic support member and wherein the flow-through direction through the at least one nozzle is parallel to the flow-through direction of the channels of the monolithic support member.

Step (iii)

In the context of the present invention, there are no specific restrictions as far as the distance of the at least one spray nozzle from the monolithic support member is concerned. It was found, however, that regarding above-defined suspensions and above-defined mean droplet sizes, it is advantageous that the distance between the at least one spray nozzle and the monolithic support member is less than or equal to 35 mm, preferably less than or equal to 25 mm, more preferably in the range of from 15 to 25 mm.

Depending on the number of channels of the monolithic support member to be coated, it is possible to either use one spray nozzle or to use more than one spray nozzles to direct the gas stream towards the monolithic support member. If the monolithic support member comprises only a few parallel channels, it is conceivable to use exactly one spray nozzle which is arranged in a fixed position relative to the monolithic support member. In order to possibly improve the characteristics of the coated monolithic support member of the present invention, it is also possible to arrange the spray nozzle and the monolithic support member so that the position of the nozzle and the member are freely adjustable. Thus, according to a preferred embodiment of the present invention, during directing the gas stream in (iii) towards the monolithic support member by spraying, the spray nozzle located opposite the monolithic support member is moved in directions perpendicular to the longitudinal axis of the nozzle.

According to another embodiment of the present invention, it is also possible to employ at least two spray nozzles for directing the gas stream towards the monolithic support member. If two or more spray nozzles are employed, the nozzles may be arranged in parallel with equal or different distances between the individual nozzles. Further, it is possible to employ the nozzles in two or more such rows wherein each row of nozzles contains at least two nozzles and wherein the distances between individual rows of nozzles are the same or different from each other. One individual nozzle and/or one row of nozzles and/or all nozzles can be arranged in a fixed position relative to the monolithic support member. In order to possibly improve the characteristics of the coated monolithic support member of the present invention, it is also possible to arrange the at least one row of spray nozzles and the monolithic support member so that the position of the nozzles and the member are freely adjustable. Thus, according to a preferred embodiment of the present invention, during directing the gas stream in (iii) towards the monolithic support member by spraying, the spray nozzles located opposite the monolithic support member are moved in directions perpendicular to the longitudinal axis of the nozzle.

Summarized, the present invention also relates to above-defined method wherein during directing the gas stream in (iii) towards the monolithic support member by spraying, at least one spray nozzle located opposite the monolithic support member is moved in directions perpendicular to the longitudinal axis of the nozzle.

According to the present invention, it is especially preferred that the longitudinal axis of the at least one spray nozzle is positioned in the same direction as the longitudinal axis of the channels of the monolithic support member. Generally, it is possible to arrange the at least one nozzle and the monolithic support member so that both the longitudinal axes of the at least one nozzle and the longitudinal axes of the channels of the monolithic support member are horizontally or vertically arranged. In case they are vertically arranged, it is generally possible to direct the gas stream in bottom-up direction or in top-down direction towards the monolithic support member, with the top-down direction being preferred. According to the present invention, it was found that it is advantageous to arrange the at least one nozzle and the monolithic support member in such a way that the gas stream is directed to the monolithic support member in angular top downwards direction at an angle of from 30° to 60°, preferably from 35° to 55°, more preferably from 40° to 50°. More preferably, this angle is essentially 45°.

It is also conceivable in the context of the present invention to arrange both at least one nozzle and the monolithic support member so that during directing the gas stream towards the monolithic support member, the angular top-down direction can be varied.

According to a preferred embodiment of the present invention, especially advantageous characteristics of the coated monolithic support member are obtained for dispersed suspensions as defined above which are directed through the channels of the monolithic support member with specific mass flows. Preferably, the mass flow of the dispersed suspension through the channels of the monolithic support member is in the range of from 0.1 g/min/cm$^2$ to 1 g/min/cm$^2$, more preferably from 0.2 g/min/cm$^2$ to 0.8 g/min/cm$^2$, more preferably from 0.3 to 0.6 g/min/cm$^2$, wherein 1 cm$^2$ refers to 1 cm$^2$ of the cross-section profile of the monolithic support member. The term “mass flow” as used in this context of the present invention relates to the mass of the suspension directed through the channels.

According to a further preferred embodiment of the present invention, especially advantageous characteristics of the coated monolithic support member are obtained for dispersed suspensions as defined above which are directed towards the monolithic support member for a certain period of time. Preferably, in (iii), the gas stream is directed towards the monolithic support member for a time in the range of from 10 s/cm² to 10 min/cm², more preferably from 15 s/cm² to 7 min/cm², more preferably from 20 s/cm² to 5 min/cm² per spray nozzle, wherein 1 cm² refers to 1 cm² of the cross-section profile of the monolithic support member.

According to the present invention, the gas stream can be directed towards the monolithic support member in one or more steps. If the gas stream is directed towards the monolithic support member in at least one step, 1 to 16, more preferably 1 to 8 steps are carried out. If more than 1 step is carried out, 2, 4, or 8 steps are preferred, with 4 and 8 steps being more preferred and 4 steps being particularly preferred. Still further preferred are embodiments wherein between 2 consecutive steps, the monolithic support member is turned around its longitudinal axis.

Thus, according to an embodiment, the present invention relates to above-defined method wherein the channels of the monolithic support member have a rectangular, preferably a square cross-section profile, wherein the suspension is directed towards, preferably sprayed onto the monolithic support member in 4 or 8 steps and wherein between 2 consecutive steps, the monolithic support member is turned around its longitudinal axis through 85° to 95°, preferably essentially 90°.

As described above, especially advantageous characteristics of the coated monolithic support member are obtained for dispersed suspensions as defined above which are directed towards the monolithic support member for a certain period of time. Above-defined preferred periods of time relate to the total time for which the gas stream is directed towards the monolithic support member, namely the time over all consecutive steps in case more than 1 step is carried out.

Step (iv)

After having directed the gas stream towards the monolithic support member and through its channels wherein the coating is applied to the walls of the channels, it is preferred to dry the monolithic support member at one or more suitable temperatures. These temperatures depend on the composition of the coating. According to preferred embodiments of the present invention according to which the suspension obtained from (i) contains at least one catalytically active material, and more preferably at least one carrier, the temperatures are preferably less than or equal to 450° C. Even more preferably, the temperature is in the range of from 100 to 450° C., more preferably from 100 to 400° C. Therefore, the present invention also relates to above-defined method which further comprises (iv) drying the monolithic support member obtained from (iii) at a temperature of less than or equal to 450° C., preferably at a temperature in the range of from 100 to 450° C., more preferably from 100 to 400° C.

Drying is carried out with any suitable apparatus. For example, drying can be carried out by placing the coated monolithic support member in a suitable oven. Preferably, drying is accomplished by blowing heated gas through the coated channels of the monolithic support member. As to the gas stream used for drying the monolithic support member, the chemical nature of the gases employed according to the present invention usually depends on the chemical nature of the coating. For a preferred embodiment according to the present invention wherein the coating contains at least one catalytically active metal and preferably, in addition to the at least one metal, at least one suitable carrier, preferred gases employed for drying in (iv) are selected from the group consisting of air, nitrogen, argon, steam, carbon dioxide, and a mixture of two or more thereof.

According to a preferred embodiment of the present invention wherein the gas stream is directed towards the monolithic support member in at least 2 consecutive steps, drying can be carried out between such 2 consecutive steps, irrespective whether or not the monolithic support member is turned around its longitudinal axis between these steps.

According to conceivable embodiments of the present invention, a first gas stream comprising droplets of a first suspension can be directed towards the monolithic support member in at least one step wherefrom a coated monolithic support member is obtained containing a first coating in the channels. A second gas stream comprising droplets of a second suspension can be directed to such coated monolithic support member in at least one further step wherein the second suspension can be identical to or different from the first suspension in at least one feature such as viscosity, solid content, particle size, and/or chemical composition. Further, the second gas stream can comprise droplets which can have identical or different size compared to the droplets of the first gas stream. Moreover, it is also conceivable that the gas second gas stream is directed towards the monolithic support member so that the mass flow of the second gas stream is identical to or different from the mass flow or the first gas stream, and/or the time for which the second gas stream is directed towards the monolithic support member is identical to or different from the time for which the first gas stream is directed towards the monolithic support member, and/or the number of steps in which the second gas stream is directed towards the monolithic support member is identical to or different from the number of steps in which the first gas stream is directed towards the monolithic support member. Directing a third, a fourth or even more gas streams towards the monolithic support member is also conceivable. Thus, the present invention also describes a process according to which two or more different coatings, for example in the form of different layers, are applied to a monolithic support member.

Generally, drying in (iv) can be carried out at a temperature which is kept essentially constant during drying. However, it is also possible to use two or more temperatures, each of the temperatures being kept essentially constant for a certain period of time. Further, it is also possible to start the drying process at a given temperature and continuously increase or decrease the temperature.

After drying, and depending on the chemical nature of the coating, it is also conceivable that at least one calcination step is performed at temperatures which are usually higher than the drying temperatures. If carried out, the atmosphere under which calcination is carried out may be the same as or different from the atmosphere under which drying is carried out. Typical calcinations temperatures are in the range of from 500 to 600° C., preferably from 525 to 575° C. Typical calcinations times are in the range of from 5 min to 12 hours, preferably from 30 min to 2 hours.

Preferred monolithic support members employed in the method of the present invention have channels with a polygonal cross-section. Especially preferred are channels with rectangular cross-section profile, with a square cross-section profile being especially preferred.

Generally, the edges of the cross-section profiles of the non-coated channels may have any suitable length. However, as to above-defined preferred suspension and preferred parameters of directing this suspension towards the monolithic support members, monolithic support members are preferred wherein the edges of the cross-section profile of the non-coated channels of the monolithic support member have a length in the range of from 0.5 to 2.5 mm, preferably from 0.55 to 2.0 mm, more preferably from 0.6 to 1.5 mm.

Generally, the channels of the monolithic support member may have any suitable length. However, as to above-defined preferred suspension and preferred parameters of directing this suspension towards the monolithic support members, monolithic support members are preferred wherein the channels of the monolithic support member have a length in the range of from 5 to 31 cm, preferably from 5 to 16 cm.

According to a conceivable embodiment of the present invention, support members having longer channels are also possible. If such members with longer channels are employed, it is possible that in one or more steps, the gas stream is directed towards the first cross-section profile, for example the inlet end of the monolithic support member. Between 2 suitable consecutive steps, the monolithic support member is turned around so that after turning, the gas stream is directed towards to second cross-section profile, for example the outlet end of the monolithic support member.

Preferred monolithic support members employed in the method of the present invention are composed of ceramic-like materials such as cordierite, alumina like alpha-alumina, silicon carbide, silicon nitride, zirconia, mullite, spodumene, aluminum titanate, alumina-silica-magnesia or zirconium silicate, or of refractory metals such as stainless steel. More preferred monolithic support members are formed from cordierite and silicon carbide. Ceramic wall flow substrates are typically formed of a material having a porosity of about 40 to 70%. The term "porosity" as used in this context is understood as being determined according to mercury porosity measurement according to DIN 66133. According to the present invention, wall flow substrates are preferred having a porosity in the range from 38 to 75%.

Monolithic support members employed in the process of the present invention include flow-through substrates as well as wall-flow substrates. Wall-flow substrates typically comprise an inlet end, an outlet end, a substrate axial length extending between the inlet end and the outlet end, and a plurality of passages defined by internal walls of the wall flow filter substrate wherein the plurality of passages comprise inlet passages having an open inlet end and a closed outlet end, and outlet passages having a closed inlet end and an open outlet end.

Above-defined inventive parameters of coating a monolithic support member allow, as already indicated above, for the preparation of a monolithic support member wherein in the corners of the cross-section profile of the coated channels, a low amount of coating material is deposited. In particular in the case where the coating contains a catalytically active material such as, for example, a precious metal, the inventive process allows for minimizing the amount of metal which is deposited in the corners of the cross-section profile and which is only partially or not accessible at all for the reactants to be brought into contact with the metal.

Thus, the present invention generally also relates to a monolithic support member comprising channels with walls having a coating deposited thereon, obtainable or obtained by the method of the present invention as defined above.

Further, the present invention also relates to a monolithic support member comprising channels with walls separating the channels from each other and having a coating deposited thereon, the non-coated channels having a polygonal cross-section profile, preferably a rectangular cross-section profile, more preferably a square cross-section profile, wherein the mean thickness $d_C$ of the coating in a corner of said cross-section profile is smaller than or equal to the mean thickness $d_E$ of the coating on an edge of said cross-section profile plus 85 micrometer ($d_C \leq (d_E + 85$ micrometer)), preferably plus 80 micrometer.

According to preferred embodiments of the present invention, the mean thickness $d_C$ of the coating in a corner of said cross-section profile is in the range of from ($d_E+60$ micrometer) to ($d_E+85$ micrometer), more preferably from ($d_E+60$ micrometer) to ($d_E+80$ micrometer), more preferably from ($d_E+60$ micrometer) to ($d_E+75$ micrometer).

The term "mean thickness $d_E$" as used in the context of the present application refers to the mean coating thickness determined at the middle of the edges of the cross-section profile. The term "mean thickness" is to be understood as the mean value obtained by adding n individually determined coating thickness values and dividing the obtained value by n. In the context of the present invention, n is 8. An individual value for such an edge coating thickness is determined by measuring the distance from the coating surface to the wall, e.g. from a microscopy picture of a cross section profile of a channel.

For practical purposes, the thickness can also be determined on the basis of the coating thicknesses at two adjacent edges of two adjacent channels: at the middle of a first edge (i.e. the center of an edge between the respective corners) of a first cross-section profile of a first channel, which middle of the first edge is adjacent to the middle of the edge of a second cross-section profile of a second channel, the total edge thickness ($d_{E,total}$), i.e. coating thickness at the middle of the first edge plus the thickness of the wall separating the two channels plus the coating thickness at the middle of the second edge is determined; from the obtained value, the known thickness of the wall is subtracted, and the resulting is value is divided by 2. In FIG. 2, the determination of an individual value of a coating thickness is schematically shown. In the context of the present invention, the determination as such is physically carried out by taking pictures of a cross section with a light microscope (Keyence VHX 600) and measuring said thicknesses with the implemented VHX 600 measuring software.

The term "mean thickness $d_C$" as used in the context of the present application refers to the mean value obtained by adding n individually determined corner coating thickness values and dividing the obtained value by n. An individual value for such a corner coating thickness is defined as the shortest distance between the coating surface of the fillet portion and the corner of the (non-coated) support wall. For a regularly coated channel, this shortest distance lies on the bisecting line of the corner angle.

For practical purposes, the corner thickness can also be determined in a rectangular cross-section profile on the basis of the coating thicknesses in two diagonally adjacent corners of two diagonally adjacent channels: in a first corner of a first cross-section profile of a first channel, which corner is diagonally adjacent to the corner of a second cross-section profile of a second channel, the total corner thickness ($d_{C,total}$) is determined. Based on the assumption that all walls separating the channels have the same thickness $d_W$, the total corner thickness is to be understood as the distance between the surface of the coating in the first corner and the surface of the coating in the second corner, measured at an angle of 45° relative to the edges of the cross-section profile of the (non-coated) channels. From the measured value, the wall thickness d multiplied by the square-root of 2 is subtracted, and the resulting value is divided by 2. In FIG. 2, the determination of an individual value of a coating thickness is schematically shown. In the context of the present invention, the determination as such is physically carried out by taking pictures of a cross section with a light microscope (Keyence VHX 600) and measuring said thicknesses with the implemented VHX 600 measuring software.

Typical coated monolithic support members according to the present invention comprise channels with walls separating the channels from each other and having a coating deposited thereon, the non-coated channels having a polygonal cross-section profile, wherein the junctures of two adjacent coated walls are formed by coating fillet portions, and wherein a coating fillet portion defines in cross-section a concave profile of a depth extending to the midpoint of a segment of a circle taken as disposed tangentially with respect to the two adjacent coated walls, wherein said circle has a radius R of 0.2 mm at most.

As described above, the suspension provided in (i) preferably contains at least one catalytically active metal or suitable precursor thereof, preferably also at least one carrier or suitable precursor thereof. The finally obtained coated monolithic support member, preferably after drying as described hereinabove according to step (iv), thus preferably contains at least one catalytically active metal and at least one carrier. More preferably, the coated monolithic support member comprises at least one catalytically active metal selected from the group consisting of manganese, copper, nickel, iron, chromium, zinc, palladium, platinum, rhodium, ruthenium, silver, gold and mixture of two or more thereof, more preferably from the group consisting of palladium, platinum, rhodium, ruthenium and a mixture of two or more thereof, the metal in particular being platinum or a mixture of platinum and palladium, and further comprises at least one carrier being selected from the group consisting of alumina, zirconia, silica, titania, a rare earth metal oxide such as an oxide of cerium, praseodymium, lanthanum, neodymium and samarium, silica-alumina, alumino-silicates, alumina-zirconia, alumina-chromia, alumina-rare earth metal oxide, titania-silica, titania-zirconia, titania-alumina, a zeolite, a molecular sieve, and a mixture of two or more thereof, more preferably from the group consisting of $Al_2O_3$, $ZrO_2$, $CeO_2$, $SiO_2$ and a mixture of tow or more thereof, the carrier in particular being alumina, more preferably gamma-alumina.

The coating applied to the monolithic support member according to the method of the present invention preferably contains the at least one catalytically active metal in an amount of from 20 to 200 $g/ft^3$, preferably from 25 to 150 $g/ft^3$, based on the volume of the monolithic support. If the coating contains more than one catalytically active metal, these values refer to the sum of the amounts of the individual catalytically active metals.

The coating applied to the monolithic support member according to the method of the present invention preferably contains the at least one carrier in an amount of from 0.5 to 2.5 $g/in^3$, preferably from 0.5 to 2 $g/in^3$, based on the volume of the monolithic support. If the coating contains more than one carrier, these values refer to the sum of the amounts of the individual carriers.

The coated monolithic support members obtainable or obtained according to the method of the present invention, in particular the coated monolithic support members having a coating characterised by above-defined thickness values $d_C$ and $d_E$, can be employed for all conceivable uses. In particular, the coated monolithic support member of the present invention is employed as catalytic article. Among others, the technical areas of automotive catalysis, three-way catalysis, Diesel oxidation catalysis, catalyzed soot filters, process catalysis such as hydrogenation and dehydrogenation reactions, desulphurization reactions may be mentioned. A further conceivable use is, for example, the application of the coated monolithic support member of the present invention in fuel cells. Thus, according to a preferred embodiment, the present invention relates to the use of a monolithic support member as defined above as catalytic article, preferably as catalytic article for the treatment of an exhaust gas, more preferably for the treatment of an automotive exhaust gas. Likewise, the present invention relates to a process for treating an exhaust gas, preferably an automotive exhaust gas, wherein a monolithic support member as defined above is employed as catalytic article.

In certain embodiments, the inventive coated monolithic support member can be comprised as catalytic article in an automotive exhaust gas treatment system which, in addition to the coated monolith of the present invention, comprises one or more additional components. If, for example, the coated monolithic support member is employed as catalyzed soot filter (CSF), it may be in communication such as in fluid communication with a diesel oxidation catalyst (DOC), a selective catalytic reduction (SCR) article, and/or an NOx storage and reduction (NSR) catalytic article. If, for example, the coated monolithic support member is employed as DOC, it may be in communication such as in fluid communication with a CSF, an SCR article, and/or an NSR catalytic article. If, for example, the coated monolithic support member is employed as SCR article, it may be in communication such as in fluid communication with a CSF, a DOC article, and/or an NSR catalytic article. If, for example, the coated monolithic support member is employed as NSR catalytic article, it may be in communication such as in fluid communication with a CSF, an SCR article, and/or a DOC.

The present invention includes the following embodiments, including the specific combinations of embodiments as defined by the respective dependencies:

1. A method for the preparation of a coated monolithic support member comprising channels with walls separating the channels from each other, said channels having a polygonal, preferably a rectangular, more preferably a square cross-section profile, the method comprising
   (i) providing a suspension having a viscosity in the range of from 0.5 to 100 mPas, determined by shearing the suspension at a shear rate of 100 $s^{-1}$, and having a solid content in the range of from 1 to 40 wt.-%, based on the total weight of the suspension, said suspension preferably being an aqueous suspension;
   (ii) dispersing the suspension into a gas stream to obtain a gas stream comprising droplets having a droplet size in the range of from d10 greater than or equal to 1 micrometer to d90 smaller than or equal to 100 micrometer;
   (iii) directing said gas stream comprising said droplets towards the monolithic support member along the axial direction of the channels of the support.
2. The method of embodiment 1, wherein the suspension provided in (i) has a solid content in the range of from 20 to 35 wt.-%, based on the total weight of the suspension.
3. The method of embodiment 1 or 2, wherein the suspension provided in (i) has a viscosity in the range of from 1 to 50 mPas, preferably from 1.5 to 30 mPas, more preferably from 1.5 to 20 mPas.
4. The method of any of embodiments 1 to 3, wherein the particle size $d_{90}$ of the particles of the suspension provided in (i) is smaller than or equal to 10 micrometer, preferably smaller than or equal to 7 micrometer, more preferably smaller than or equal to 5 micrometer.

5. The method of any of embodiments 1 to 4, wherein the suspension provided in (i) comprises at least one catalytically active metal or a suitable precursor thereof, the metal preferably selected from the group consisting of manganese, copper, nickel, iron, chromium, zinc, palladium, platinum, rhodium, ruthenium, silver, gold and mixture of two or more thereof, the metal more preferably being platinum or a mixture of platinum and palladium.

6. The method of embodiment 5, wherein the suspension provided in (i) comprises the at least one catalytically active metal in an amount of from 0.5 to 15 wt.-%, preferably from 1 to 10 wt.-%, based on the total weight of the solid contained in the suspension.

7. The method of any of embodiments 1 to 6, wherein the suspension provided in (i) comprises at least one carrier or a suitable precursor thereof, said carrier preferably being selected from the group consisting of alumina, zirconia, ceria, titania, silica, zeolites, molecular sieves and a mixture of two or more thereof, the carrier more preferably being alumina.

8. The method of embodiment 7, wherein the suspension provided in (i) comprises the at least one carrier or the suitable precursor thereof in an amount of from 0.01 to 40 wt.-%, preferably from 1 to 25 wt.-%, based on the total weight of the suspension.

9. The method of any of embodiments 1 to 8, wherein providing the suspension in (i) comprises
    (a) impregnating at least one carrier or suitable precursor thereof with at least one solution containing at least one catalytically active metal or suitable precursor thereof;
    (b) admixing the at least one impregnated carrier or suitable precursor thereof with water and a suitable amount of an acid to obtain a suspension having a pH in the range of from 3 to 5 a solid content in the range of from 20 to 50 wt.-%;
    (c) milling the suspension obtained in (b) obtaining a suspension wherein the particle size $d_{90}$ of the particles of the suspension provided in (i) is smaller than or equal to 10 micrometer, preferably smaller than or equal to 7 micrometer, more preferably smaller than or equal to 5 micrometer;
    (d) diluting the suspension obtained in (c) with deionized water to obtain the suspension having a viscosity in the range of from 0.5 to 100 mPas, determined by shearing the suspension at a shear rate of $100\ s^{-1}$, and having a solid content in the range of from 1 to 40 wt.-%, based on the total weight of the suspension.

10. The method of any of embodiments 1 to 9, wherein the droplet size obtained from dispersing the suspension into a gas stream is in the range of from d10 greater than or equal to 1 micrometer to d90 smaller than or equal to 100 micrometer, preferably from d10 greater than or equal to 1 micrometer to d90 smaller than or equal to 70 micrometer, more preferably from d10 greater than or equal to 1 micrometer to d90 smaller than or equal to 50 micrometer.

11. The method of any of embodiments 1 to 10, wherein in (ii), the suspension is dispersed into the gas stream by entraining the suspension into the gas stream and directing the gas stream through at least one spray nozzle, wherein the at least one spray nozzle is located opposite the monolithic support member and wherein the flow-through direction through the at least one nozzle is parallel to the flow-through direction of the channels of the monolithic support member.

12. The method of embodiment 11, wherein the distance between the at least one spray nozzle and the monolithic support member is less than or equal to 35 mm, preferably less than or equal to 25 mm, more preferably in the range of from 15 to 25 mm.

13. The method of any of embodiments 1 to 12, wherein the gas stream in which the suspension is dispersed in (ii) is selected from nitrogen, air, lean air, argon, water, and a mixture of two or more thereof.

14. The method of embodiment 13, wherein the gas stream in which the suspension is dispersed in (ii) is nitrogen containing water, the gas stream preferably containing from 53 to 99.5 vol.-% of nitrogen and from 47 to 0.5 vol.-% of water.

15. The method of any of embodiments 1 to 14, wherein the mass flow of the dispersed suspension through the channels of the monolithic support member is in the range of from 0.1 $g/min/cm^2$ to 1 $g/min/cm^2$, preferably from 0.2 $g/min/cm^2$ to 0.8 $g/min/cm^2$, more preferably from 0.3 to 0.6 $g/min/cm^2$, wherein 1 $cm^2$ refers to 1 $cm^2$ of the cross-section profile of the monolithic support member.

16. The method of any of embodiments 1 to 15, wherein in (iii), the gas stream is directed towards to monolithic support member for a time in the range of from 10 $s/cm^2$ to 10 $min/cm^2$, preferably from 15 $s/cm^2$ to 7 $min/cm^2$, more preferably from 20 $s/cm^2$ to 5 $min/cm^2$ per spray nozzle, wherein 1 $cm^2$ refers to 1 $cm^2$ of the cross-section profile of the monolithic support member.

17. The method of any of embodiments 1 to 16, wherein in (iii), the gas stream is directed towards the monolithic support member in 1 to 16 steps, preferably in 1 to 8 steps.

18. The method of embodiment 17, wherein between 2 consecutive steps, the monolithic support member is turned around its longitudinal axis.

19. The method of embodiment 17 or 18, wherein the channels of the monolithic support member have a rectangular, preferably a square cross-section profile, wherein the suspension is directed towards, preferably sprayed onto the monolithic support member in 4 or 8 steps and wherein between 2 consecutive steps, the monolithic support member is turned around its longitudinal axis through 85° to 95°, preferably essentially 90°.

20. The method of any of embodiments 1 to 19, wherein during directing the gas stream in (iii) towards the monolithic support member by spraying, at least one spray nozzle located opposite the monolithic support member is moved in directions perpendicular to the longitudinal axis of the nozzle.

21. The method of any of embodiments 1 to 20, wherein the suspension is directed towards, preferably sprayed onto the monolithic support member in angular top downwards direction at an angle of from 30° to 60°, preferably essentially 45°.

22. The method of any of embodiments 1 to 21, further comprising (iv) drying the monolithic support member obtained from (iii) at a temperature of less than or equal to 450° C., preferably at a temperature in the range of from 100 to 450° C., more preferably from 100 to 400° C.

23. The method of any of embodiments 1 to claim 22, wherein the edges of the cross-section profile of the non-coated channels of the monolithic support member have a length in the range of from 0.5 to 2.5 mm, preferably from 0.55 to 2.4 mm, more preferably from 0.6 to 1.5 mm.

24. The method of any of embodiments 1 to 23, wherein the channels of the monolithic support member have a length in the range of from 5 to 31 cm, preferably from 5 to 16 cm.

25. The method of any of embodiments 1 to 24, wherein the monolithic support member is made of silicon carbide, cordierite, alumina, aluminum titanate, or a metal, preferably of silicon carbide or cordierite.

26. A monolithic support member comprising channels with walls separating the channels from each other and having a coating deposited thereon, the non-coated channels having a polygonal cross-section profile, preferably a rectangular cross-section profile, more preferably a square cross-section profile, wherein the mean thickness $d_C$ of the coating in a corner of said cross-section profile is smaller than or equal to the mean thickness $d_E$ of the coating on an edge of said cross-section profile plus 85 micrometer ($d_C \leq (d_E + 85$ micrometer$)$), preferably plus 80 micrometer.

27. The monolithic support member of embodiment 26, wherein the support member is made of silicon carbide, cordierite, alumina, aluminum titanate, or a metal, preferably of silicon carbide or cordierite.

28. The monolithic support member of embodiment 26 or 27, wherein the channels of the monolithic support member have a length in the range of from 5 to 31 cm, preferably from 5 to 16 cm.

29. The monolithic support member of any of embodiments 26 to 28, wherein the edges of the cross-section profile of the non-coated channels of the monolithic support member have a length in the range of from 0.5 to 2.5 mm, preferably from 0.55 to 2.0 mm, more preferably from 0.6 to 1.5 mm.

30. The monolithic support member of any of embodiments 26 to 29, wherein the coating comprises at least one catalytically active metal or a suitable precursor thereof, said metal preferably being selected from the group consisting of manganese, copper, nickel, iron, chromium, zinc, palladium, platinum, rhodium, ruthenium, silver, gold and mixture of two or more thereof, the at least one catalytically active metal more preferably being platinum or a mixture of platinum and palladium.

31. The monolithic support member of embodiment 30, wherein the coating comprises the at least one catalytically active metal in an amount of from 20 to 200 g/ft$^3$, preferably from 25 to 150 g/ft$^3$, based on the volume of the monolithic support.

32. The monolithic support member of embodiment 30 or 31, additionally comprising at least one carrier, said carrier preferably being selected from the group consisting of alumina, zirconia, ceria, titania, silica, zeolites, molecular sieves and a mixture of two or more thereof, the carrier more preferably being alumina.

33. The monolithic support member of embodiment 32, wherein the coating comprises the at least one carrier in an amount of from 0.5 to 2.5 g/in$^3$, preferably from 0.5 to 2 g/in$^3$, based on the volume of the monolithic support.

34. The monolithic support member of any of embodiments 26 to 33, wherein the coating has been deposited onto the support member by a method of any of embodiments 1 to 25.

35. The monolithic support member of any of embodiments 26 to 34 for use as a catalytic article.

36. The monolithic support member of any of embodiments 26 to 35, comprised as catalytic article in an automotive exhaust gas treatment system.

37. Use of a monolithic support member according to any of embodiments 26 to 34 as catalytic article, preferably as catalytic article for the treatment of an exhaust gas, more preferably for the treatment of an automotive exhaust gas.

38. A monolithic support member comprising channels with walls having a coating deposited thereon, obtainable or obtained by a method of any of embodiments 1 to 25.

The present invention is illustrated by the following examples and comparative examples.

EXAMPLES

Example 1

Preparation of a Suspension to be Coated 1027.4 g SBa150L4 (gamma-alumina from Sasol) were weighed into a bowl. 78.97 g Pt amine hydroxide were diluted with 436.1 g deionized water and added to the SBa-150L4 and mixed for 5 minutes. 49.32 g acetic acid were diluted with 98.63 g deionized water, and added to the mixture and mixed for 15 minutes. 500 g deionized with a pH of 3.5 were weighed into a beaker, and acetic acid acid was added until the pH was 2.45.

The obtained suspension was comminuted in a stirred media mill until a particle size d90<10 micrometer was reached. Solid content at this point was 46.4 wt.-%. In a second milling step, the slurry was diluted with deionized water to about 40 wt.-% solids content and milled further until a d90<2 micrometer was reached. After milling, the slurry was further diluted to 27 wt.-% solids, and the pH was adjusted to pH=4 by adding acetic acid.

The viscosity of the finally obtained suspension was in the range of from 2 to 3 mPas, determined at a shearing rate of 100 s−1 with an Anton-Paar MCR-100 cone-plate rheometer. The solid content of the suspension was 27 wt.-%. The particle size of the solid particles contained in the suspension was d90=1.9 micrometer.

Example 2

Spraying the Suspension According to Example 1 Onto a Monolithic Support Member 2.1 As monolithic support member, a cordierite flow-through monolith was employed which had the following characteristics: 3 inches (7.62 cm) length, 1.5 inches (3.81 cm) diameter, cut out from larger monoliths (commercially available, Corning Celcor®, from Corning Inc.), cell density 400 cpsi (cells per square inch)

2.2 As spray nozzle, a two-phase Schlick nozzle, type 970 form 4 S3 was employed. The distance from the nozzle outlet to the surface of the monolithic support member was 24 mm. The nozzle and the monolithic support member were arranged so that the gas stream to be applied onto the monolithic support member was sprayed onto the monolithic support member in angular top downwards direction at an angle of 45° (cf. FIG. 1).

2.3 The suspension obtained in Example 1 was fed into the nozzle with a mass flow of 240 g/h. The gas stream fed into the nozzle was nitrogen which had been essentially saturated with water at room temperature in a bubble-through vessel, thus containing about 2 vol.-% of water. The gas stream was fed into the nozzle with a pressure of 1 barg.

2.4 The mass flow of the dispersed suspension through the channels of the monolithic support member was 0.135 g/min/cm$^2$.

2.5 The suspension was directed to the monolithic support member in 8 steps. During the first 4 steps, the gas stream was directed to the first side of the monolithic support member. After the fourth step, the monolithic support member was turned around, and the gas stream was directed to the second side of the monolithic support member in 4 steps. Between every 2 consecutive steps during which the gas stream was directed to a given side of the monolithic support member, the monolithic support member was turned around its longitudinal axis for 90°.

The total spraying time was 4 minutes, 30 s for each step, corresponding to a total value of 21 s/cm$^2$, wherein 1 cm$^2$ refers to 1 cm$^2$ of the cross-section profile of the monolithic support member.

2.6 After each step, the channels of the monolithic support member were shortly (ca. 5 seconds) blown through with an air gun and pre-dried using a hot air blower. The set temperature of the blower was 350° C., the temperature of the air directed through the channels was between 100 and 150° C. Pre-drying with the hot air blower was carried out for about 30 seconds. Thereafter, the monolith was put upright into an oven and dried at 400° C. for 10 minutes.

After the last spraying and drying step, the monolith was calcined for 60 minutes at 550° C. in the same oven.

2.7 The finally obtained coated monolithic support member is shown in FIG. 3. The mean thickness $d_E$ of the coating was about 25 micrometer (mean total thickness was 174 micrometer, measured wall thickness was from 120 to 130 micrometer, thus 125 micrometer were assumed), and the mean thickness $d_C$ of the coating was 84 micrometer (mean total thickness was 345 micrometer, wall thickness was 125 micrometer).

Clearly, the corners of the cross-section profile of the coated monolithic support member contained a very low amount of coating material. This is illustrated by the mean thickness $d_C$ and the mean thickness $d_E$ which satisfy the equation $d_C<d_E+80$ micrometer. The radius R in the corners of the cross-section profile, as defined above for typical coated monolithic support members of the present invention, is from 100 to 150 micrometer, i.e. below 0.2 mm.

The finally obtained coated monolithic support member had a content of catalytically active metal (platinum) of 25 g/ft$^3$ and a total washcoat loading of 1.16 g/in$^3$ (washcoat loading defined as carrier+active material).

Comparative Example 1

Dip-Coating

The suspension as prepared according to Example 1 was used for dip-coating the monolithic support member used in Example 2, section 2.1.

The monolith was laid into a beaker that contained the slurry and was kept therein for 5 minutes. The monolith was taken out of the beaker, the channels were blown through with an air gun, and dried according to the same procedure as given in example 1 (hot air blower about 30 sec., then 10 minutes at 400° C.). This procedure was repeated once (i.e. two coating steps in total). After the second drying step, the monolith was calcined for 60 minutes at 550° C.

The finally obtained coated monolithic support member is shown in FIG. 4. The mean thickness $d_E$ of the coating was 23 micrometer (=(170−125) micrometer/2), and the mean thickness $d_C$ of the coating was about 120 micrometer (calculated from mean total thickness which was 418 micrometer, wall thickness was 125 micrometer).

Clearly, the corners of the cross-section profile of the coated monolithic support member contain considerably more coating material than the corners of the cross-section profile as obtained from the inventive method according to Example 1. This is illustrated by the mean thickness $d_C$ and the mean thickness $d_E$ which did not satisfy the equation $d_C<d_E+85$ micrometer. Quite to the contrary, in this comparative example, $d_C=d_E+97$ micrometer. The radius R in the corners of the cross-section profile, as defined above, is from 200 to 250 micrometer, i.e. at least 0.2 mm and, thus, above the value typically obtained for coated monolithic support members of the present invention.

The finally obtained coated monolithic support member had a content of catalytically active metal (platinum) of 29 g/ft$^3$ and carrier (alumina) content of 1.36 g/in$^3$.

Comparative Example 2

Dip-Coating

A suspension was prepared having a solid content of 42 wt.-% and a viscosity of 25 mPas.

Preparation of the suspension was done according to the same recipe as described in Example 1 (all steps before milling), but was prepared in another batch.

Milling was performed only once wherein 5 drops octanol were added during milling. The final slurry had a pH of 4.07, a viscosity of 25 mPas, and a solid content of 42.4 wt.-%. The particles of the suspension had a size of $d_{90}=11.36$ micrometer.

For dip-coating purposes, the monolithic support member as described in Example 1 was submerged in above-described suspension with channels down (vertical position). The monolithic support member was kept in this position for about 1 minute. Then, the support member was removed from the suspension and excess suspension was allowed to drain out through the channels. The drain direction was with monolith rotated for 180° (flipped) when removed from the suspension. The outside surface "skin" of the monolithic support member was wiped to remove excess suspension. The monolith channels were cleared and excess suspension was removed using an air-gun.

The monolithic support member was placed directly into an oven at 400° C. for 1 hour for drying, and finally it was calcined at 550° C. for 1 hour.

Figure 5:
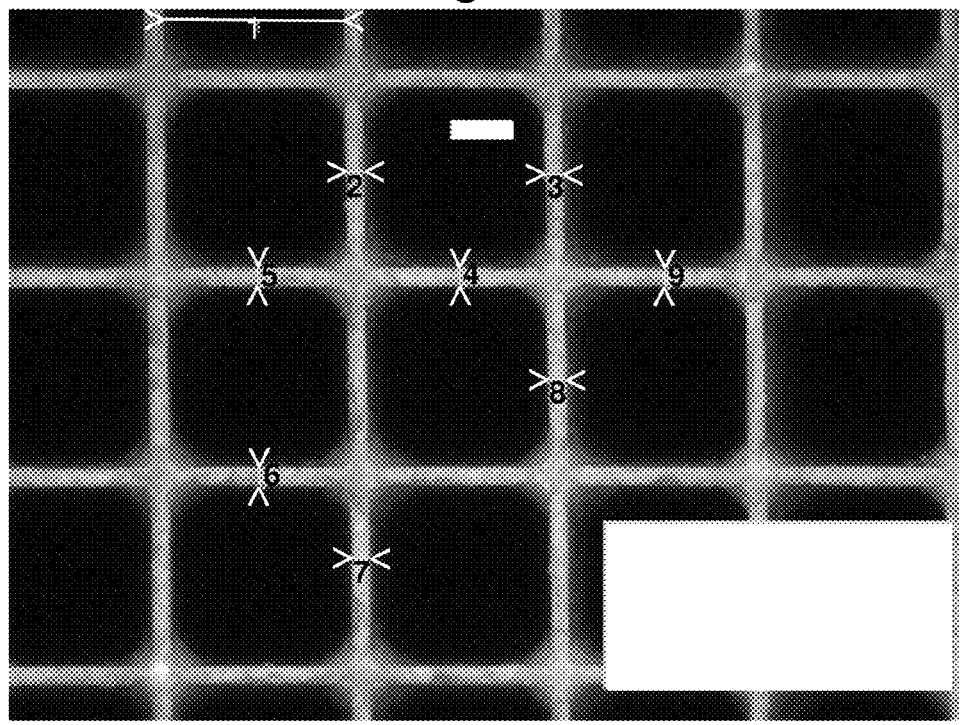
Figure 5:
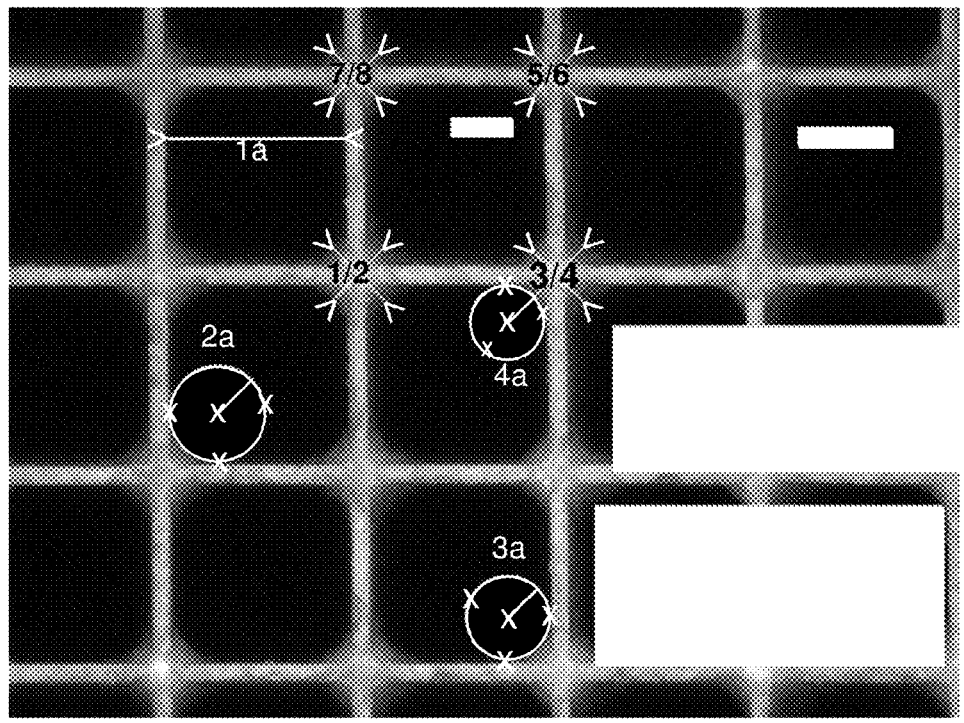

The finally obtained coated monolithic support member is shown in FIG. 5. The mean thickness $d_E$ of the coating was about 4 micrometer (=about (132−125) micrometer/2), and the mean thickness $d_C$ of the coating was about 132 micrometer (total=440 micrometer, wall=125 micrometer).

Clearly, the corners of the cross-section profile of the coated contain considerably more coating material than the corners of the cross-section as obtained from the inventive method. This is illustrated by the mean thickness $d_C$ and the mean thickness $d_E$ which do not satisfy the equation $d_C<=d_E+85$ micrometer. Quite to the contrary, in this comparative example, $d_C=d_E+128$. The radius R in the corners of the cross-section profile, as defined above, is from 250 to 300 micrometer, i.e. at least 0.25 mm and, thus, above the value typically obtained for coated monolithic support members of the present invention.

The finally obtained coated monolithic support member had a content of catalytically active metal (platinum) of 29 g/ft$^3$ and a total washcoat load of 1.26 g/in$^3$.

Comparative Example 3

Spray-Coating

A suspension was prepared in essentially the same manner as the suspension according to Example 1. However, the viscosity of this suspension was 130 mPas.

The suspension was prepared in the same way as for Example 1. After milling to $d_{90}=1.6$ micrometer, the suspension was diluted with deionized water to a solid content of about 25 weight-%. Then, boehmite (gamma-aluminum hydroxide) suspension (commercially available product, Dispal 23N4-20 from Sasol) was added in such an amount that the boehmite content of the suspension was 4 wt.-% of total suspension weight. The suspension finally had a solid content of 29.9 wt.-% and a viscosity of 130 mPas.

This suspension was sprayed onto the monolith according to the method described in the following:

A monolithic support member of the same kind as described in Example 2.1 was employed.

The same spray nozzle as described in Example 2.2 was employed. The nozzle and the monolithic support member were arranged so that the gas stream to be applied onto the monolithic support member was sprayed onto the monolithic support member in angular top downwards direction at an angle of 45° (cf. FIG. 1).

The suspension was sprayed onto the monolith in 8 steps. Between every 2 steps, the monolith was turned around by 180°. On every second 180° turn, an additional 90° rotation around the longitudinal axis of the monolith was done.

During the first 4 spraying steps, the nozzle was located 20 mm away from the monolith; spray duration was 5 minutes. During spraying steps 5 and 6, the nozzle distance was 35 mm, duration was 20 minutes. During spraying steps 7 and 8, the nozzle distance was 70 mm, duration was 20 minutes.

The suspension mass flow was not measured during this experiment. The gas stream fed into the nozzle was dry nitrogen. The gas stream was fed into the nozzle with a pressure of 1 barg.

The mass flow of the dispersed suspension through the channels of the monolithic support member was 0.01 g/min/cm².

The total spraying time was 100 minutes, corresponding to a total value of 525 s/cm², wherein 1 cm² refers to 1 cm² of the cross-section profile of the monolithic support member.

After each step, the channels of the monolithic support member were shortly (about 5 seconds) blown through with an air gun and pre-dried using a hot air blower. The set temperature of the blower was 350° C., the temperature of the air directed through the channels was between 100 and 150° C. Pre-drying with the hot air blower was done for about 30 seconds. Thereafter, the monolith was put upright into an oven and dried at 400° C. for 10 minutes.

Figure 6:
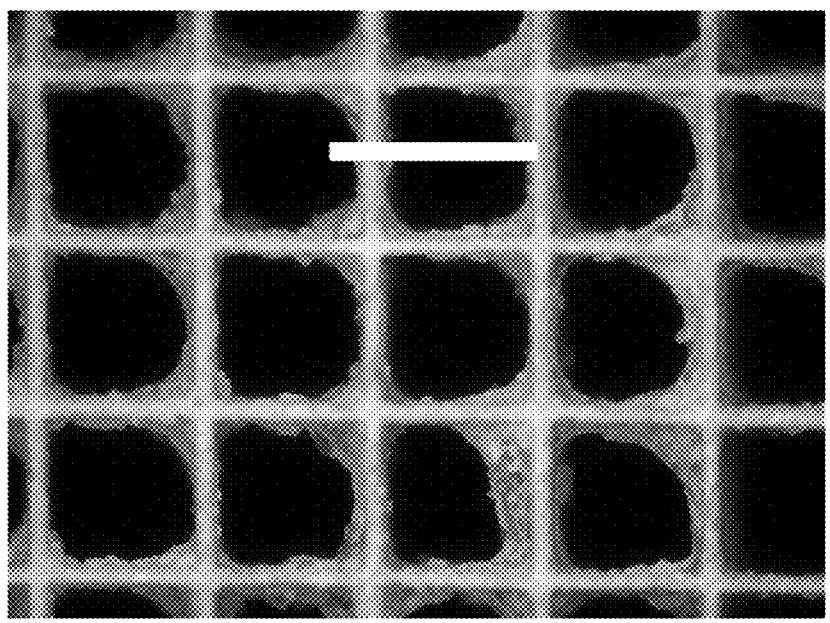

After the last spraying and drying step, the monolith was calcined for 60 minutes at 550° C. in the same oven. The finally obtained coated monolithic support member is shown in FIG. 6. As can be clearly seen, the obtained coating is very inhomogeneous as far as coating thickness and corner radii are concerned. Even without exactly measuring the corner thicknesses, if can be clearly seen that considerably more material is contained in the corners of the cross-section profile than in the corners of the cross-section profile obtained according to the process of the present invention.

The finally obtained coated monolithic support member had a content of catalytically active metal (platinum) of 40 g/ft³ and a total washcoat load of 1.9 g/in³.

Comparative Example 4

Spray-Coating

A suspension was prepared in essentially the same manner as the suspension according to Example 1. However, the solid content of this suspension was 42 wt.-%.

The suspension was prepared in the same way as described in Example 1. However, after milling, the suspension was not diluted with water, but used as it was. The suspension had a solid content of 42 wt.-%, particle size $d_{90}$ was 7 micrometer, and the viscosity was 2.5 mPas.

Figure 7:
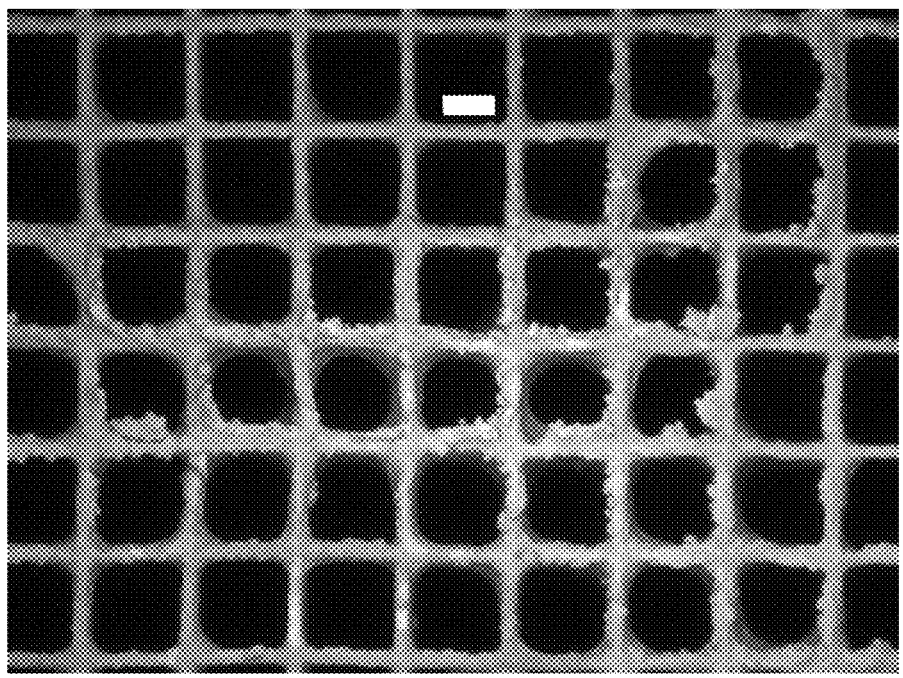

This suspension was sprayed onto the monolith according to the method as described in Example 2, sections 2.1 to 2.6 with the exceptions that dry nitrogen was used as dispersing gas and the duration of each spray interval was 20 seconds The finally obtained coated monolithic support member is shown in FIG. 7. As can be clearly seen, the obtained coating is very inhomogeneous as far as coating thickness and corner radii are concerned. Measuring the corner thicknesses was not necessary to see that considerably more material is contained in the corners.

The finally obtained coated monolithic support member had a content of catalytically active metal (platinum) of 23 g/ft³ and a washcoat loading of 0.94 g/in³.

Example 3

Testing the Monolithic Support Members of Example 2, Comparative Example 1 and Comparative Example 2

The coated monolithic support members of Example 2, Comparative Example 1 and Comparative Example 2 were used as catalytic articles. For this purpose, the catalytic articles were brought into contact with a hydrocarbon containing gas stream as follows:

Prior to the catalytic test, the monolithic support members were conditioned ("aged") for 5 hours at 750° C. in an air atmosphere containing 10% of water. Then, the monolithic support members were put into a reactor where a gas stream was flowing through the coated monolithic support members with a GHSV (gas hourly space velocity) of 55000 h$^{-1}$. The gas stream consisted of nitrogen containing 1500 ppm CO, 150 ppm $C_1$ HC ($C_3H_6/CH_4=4/1$); 100 ppm NO, 13% $O_2$, 10% $CO_2$, and 5% $H_2O$. The temperature in the reactor was increased at a rate of 20 K/min. The conversion of carbon monoxide and of hydrocarbons as a function of temperature was monitored by analyzing the exit gas composition with an infrared photometer Uras 14 from ABB (CO analysis) and a flame ionisation detector (FID) from ABB (hydrocarbon analysis). The conversion rates were calculated based on these results.

Figure 8:
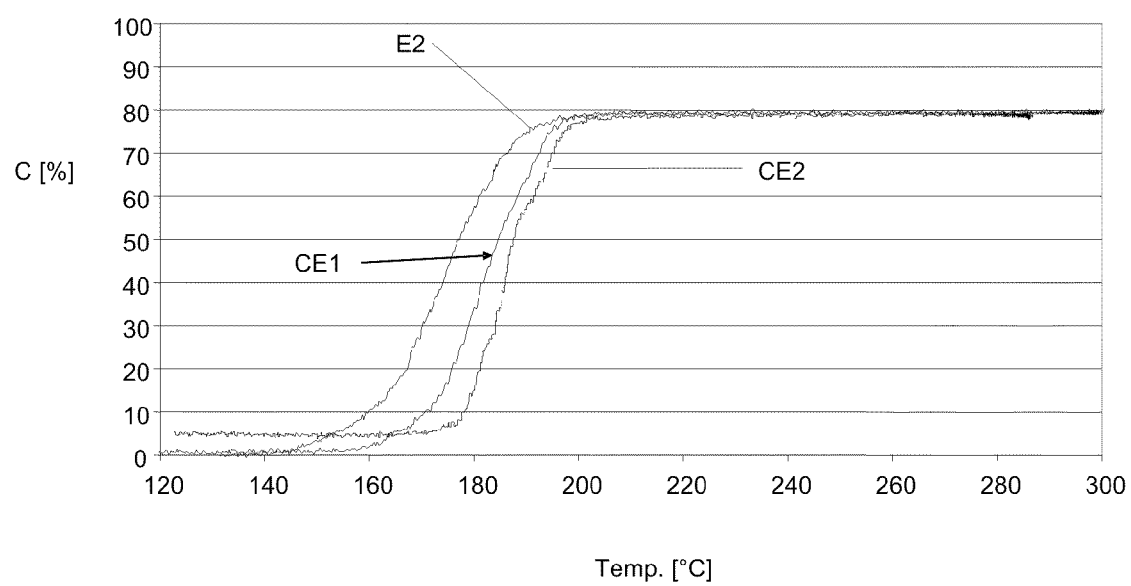

In FIG. 8, the test result if shown. Clearly, the coated monolithic support member exhibits the most advantageous characteristics in that the HC conversion is achieved at considerable lower temperatures compared to the monolithic support members of Comparative Examples 1 and 2. In particular, when using the inventive coated monolithic support member, HC conversion started already at temperatures of about 140° C. whereas in case the other members are employed, conversion starts at about 150° C. or even at about 175° C. A 50% conversion is achieved at a temperature which is at least 7° C. lower compared to the comparative monoliths.

It is noted that these advantageous results are obtained although the coated monolithic support member of the present invention contains a lower amount of catalytically active metal (25 g/ft³) than the coated monolithic support members according to the comparative examples (29 g/ft³). This is a clear indication that the inventive method indeed leads to highly superior coated monolithic support members.

The invention claimed is:

1. A monolithic support member comprising channels having a polygonal cross-section profile, with walls separating the channels from each other and the walls having a coating deposited thereon, wherein a mean thickness $d_C$ is the shortest distance between a surface of the coating of a fillet portion and a corner of the wall and wherein the mean thickness $d_C$ of the coating in the corner of said cross-section profile is smaller than or equal to a mean thickness $d_E$ of the coating on an edge of said cross-section profile plus 85 micrometer ($d_C \leq (d_E + 85$ micrometer)), wherein the coating has a radius of curvature R that is at most 0.2 mm, and wherein the coating contains at least one carrier in an amount from 0.5 to 2.5 g/in$^3$ based on the volume of the monolithic support, wherein said monolithic support member is prepared by a method comprising:
   (i) providing a suspension having a viscosity in a range of from 1.5 to 5 mPas, determined by shearing the suspension at a shear rate of 100 s$^{-1}$, and having a solid content in a range of from 20 to 30 wt.-%, based on the total weight of the suspension;
   (ii) dispersing the suspension into a gas stream to obtain a gas stream comprising droplets having a droplet size in the range of from $d_{10}$ greater than or equal to 1 micrometer to $d_{90}$ less than or equal to 100 micrometer; and
   (iii) directing said gas stream comprising said droplets towards the monolithic support member along an axial direction of the channels of the support.

2. The monolithic support member of claim 1, wherein the polygonal cross-section profile is a square cross-section profile.

3. The monolithic support member of claim 1, wherein the edges of the polygonal cross-section profile of the channels of the monolithic support member have a length in the range of from 0.5 to 2.5 mm, and the channels of the monolithic support member have a length in the range of from 5 to 31 cm, the support member being made of silicon carbide, cordierite, alumina, aluminum titanate, or a metal.

4. The monolithic support member of claim 1, wherein the coating comprises at least one catalytically active metal in an amount of from 20 to 200 g/ft$^3$, based on the volume of the monolithic support.

5. The monolithic support member of claim 1 for use as a catalytic article.

6. The monolithic support member of claim 1, comprised as a catalytic article in an automotive exhaust gas treatment system.

7. A process for treating an exhaust gas, wherein a monolithic support member according to claim 1 is employed as catalytic article.

8. A method for the preparation of a coated monolithic support member according to claim 1, the method comprising
   (i) providing a suspension having a viscosity in the range of from 1.5 to 5 mPas, determined by shearing the suspension at a shear rate of 100 s$^{-1}$, and having a solid content in the range of from 20 to 30 wt.-%, based on the total weight of the suspension;
   (ii) dispersing the suspension into a gas stream to obtain a gas stream comprising droplets having a droplet size in the range of from $d_{10}$ greater than or equal to 1 micrometer to $d_{90}$ smaller than or equal to 100 micrometer;
   (iii) directing said gas stream comprising said droplets toward the monolithic support member along the axial direction of the channels of the support.

9. The method of claim 8, wherein said channels have a square cross-section profile.

10. The method of claim 8, wherein the suspension provided in (i) is an aqueous suspension.

11. The method of claim 8, wherein the particle size $d_{90}$ of the particles of the suspension provided in (i) is smaller than or equal to 10 micrometer.

12. The method of claim 8, wherein the suspension provided in (i) comprises at least one catalytically active metal or a suitable precursor thereof.

13. The method of claim 12, wherein the suspension provided in (i) comprises the at least one catalytically active metal in an amount of from 0.5 to 15 wt.-%.

14. The method of claim 8, wherein the suspension provided in (i) comprises at least one carrier or a suitable precursor thereof.

15. The method of claim 8, wherein providing the suspension in (i) comprises
   (a) impregnating at least one carrier or suitable precursor thereof with at least one solution containing at least one catalytically active metal or suitable precursor thereof;
   (b) admixing the at least one impregnated carrier or suitable precursor thereof with water and a suitable amount of an acid to obtain a suspension having a pH in the range of from 3 to 5 a solid content in the range of from 20 to 50 wt.-%;
   (c) milling the suspension obtained in (b) obtaining a suspension wherein the particle size $d_{90}$ of the particles of the suspension provided in (i) is smaller than or equal to 10 micrometer;
   (d) diluting the suspension obtained in (c) with deionized water to obtain the suspension having a viscosity in the range of from 1.5-5 mPas, determined by shearing the suspension at a shear rate of 100 s$^{-1}$ and having a solid content in the range of from 20-30 wt.-%, based on the total weight of the suspension.

16. The method of claim 8, wherein in (ii), the suspension is dispersed into the gas stream by entraining the suspension into the gas stream and directing the gas stream through at least one spray nozzle, wherein the at least one spray nozzle is located opposite the monolithic support member and wherein the flow-through direction through the at least one nozzle is parallel to the flow-through direction of the channels of the monolithic support member.

17. The method of claim 16, wherein the distance between the at least one spray nozzle and the monolithic support member is less than or equal to 35 mm.

18. The method of claim 8, wherein the gas stream in which the suspension is dispersed in (ii) is selected from nitrogen, air, lean air, argon, water, and a mixture of two or more thereof.

19. The method of claim 8, wherein the mass flow of the dispersed suspension through the channels of the monolithic support member is in the range of from 0.1 g/min/cm$^2$ to 1 g/min/cm$^2$, wherein 1 cm$^2$ refers to 1 cm$^2$ of the cross-section profile of the monolithic support member and wherein in (iii), the gas stream is directed towards to monolithic support member for a time in the range of from 10 s/cm$^2$ to 10 min/cm$^2$ per spray nozzle, wherein 1 cm$^2$ refers to 1 cm$^2$ of the cross-section profile of the monolithic support member.

20. The method of claim 8, wherein in (iii), the gas stream is directed towards the monolithic support member in 1 to 8 steps, wherein between 2 consecutive steps, the monolithic support member is turned around its longitudinal axis.

21. The method of claim 20, wherein the channels of the monolithic support member have a square cross-section profile, wherein the suspension is sprayed onto the monolithic support member in 4 or 8 steps and wherein between 2 consecutive steps, the monolithic support member is turned around its longitudinal axis through essentially 90°.

22. The method of claim 8, wherein during directing the gas stream in (iii) towards the monolithic support member by spraying, at least one spray nozzle located opposite the monolithic support member is moved in directions perpendicular to the longitudinal axis of the nozzle.

23. The method of claim 8, wherein the suspension is sprayed onto the monolithic support member in angular top downwards direction at an angle of essentially 45°.

24. The method of claim 8, further comprising
(iv) drying the monolithic support member obtained from (iii) at a temperature in the range of from 100 to 450° C.

25. The method claim 8, wherein the edges of the cross-section profile of the non-coated channels of the monolithic support member have a length in the range of from 0.5 to 2.5 mm, and wherein the channels of the monolithic support member have a length in the range of from 5 to 31 cm, the monolithic support member being made of silicon carbide, cordierite, alumina, aluminum titanate, or a metal.

* * * * *